United States Patent [19]

Little et al.

[11]  4,268,722

[45]  May 19, 1981

[54] RADIOTELEPHONE COMMUNICATIONS SYSTEM

[75] Inventors: Richard I. Little, Barrington; Barry D. Lubin, Schaumburg; Stephen L. Spear, Lincolnwood, all of Ill.

[73] Assignee: Motorola, Inc., Schaumburg, Ill.

[21] Appl. No.: 72,875

[22] Filed: Sep. 6, 1979

Related U.S. Application Data

[63] Continuation-in-part of Ser. No. 876,956, Feb. 13, 1978, abandoned.

[51] Int. Cl.³ .......................................... H04M 11/00
[52] U.S. Cl. ................................ 179/2 EB; 370/110; 370/62
[58] Field of Search ................. 179/2 EB, 2 EA, 2 E; 370/58, 62, 68, 110

[56] References Cited

U.S. PATENT DOCUMENTS

| | | | |
|---|---|---|---|
| 3,207,851 | 9/1965 | Fukinuki | 179/15 BY |
| 3,823,269 | 7/1974 | Saito | 179/15 BF |
| 3,898,390 | 8/1975 | Wells | 179/2 EB |
| 3,956,593 | 5/1976 | Collins | 179/15 AQ |
| 3,997,727 | 12/1976 | Platts | 179/15 AQ |
| 3,997,728 | 12/1976 | Duquesne | 179/15 BY |
| 4,064,369 | 12/1977 | Battocletti | 179/15 BF |

*Primary Examiner*—David L. Stewart
*Attorney, Agent, or Firm*—Rolland R. Hackbart; James W. Gillman

[57] ABSTRACT

A telephone system for providing communications between mobile radiotelephones, portable radiotelephones and landline telephones includes a land-line telephone system including a land-line switching network for providing communication paths for land-line telephones and a mobile radiotelephone system for providing communications paths for mobile and portable radiotelephones. The mobile radiotelephone system includes a digital switching network, base stations, and PCM analog-to-digital (A/D) and digital-to-analog (D/A) converters interposed between the base stations and the digital switching network and between the land-line switching network and the digital switching network. Analog ports are interfaced by the PCM A/D and D/A converters to incoming and outgoing serial bit streams coded according to pulse-code-modulation (PCM) techniques standardized for telecommunications systems by the International Telegraph and Telephone Consultative Committee (CCITT).

The digital switching network receives the incoming serial PCM bit streams and provides the outgoing serial PCM bit streams so that telephone calls are automatically routed between the calling and called parties in the telephone system. Supervisory signalling is detected from the incoming serial PCM bit streams and processed by a signal processing computer to determine an ordering of time slots for the PCM channels for controlling the interchange of PCM channels from the incoming serial PCM bit streams to the outgoing serial PCM bit streams. Supervisory signalling for outgoing PCM channels corresponding to the incoming supervisory signalling from incoming PCM channels is adapted to to a pre-established format recognized by the corresponding outgoing PCM channels and multiplexed into the respective outgoing serial PCM bit streams.

26 Claims, 13 Drawing Figures

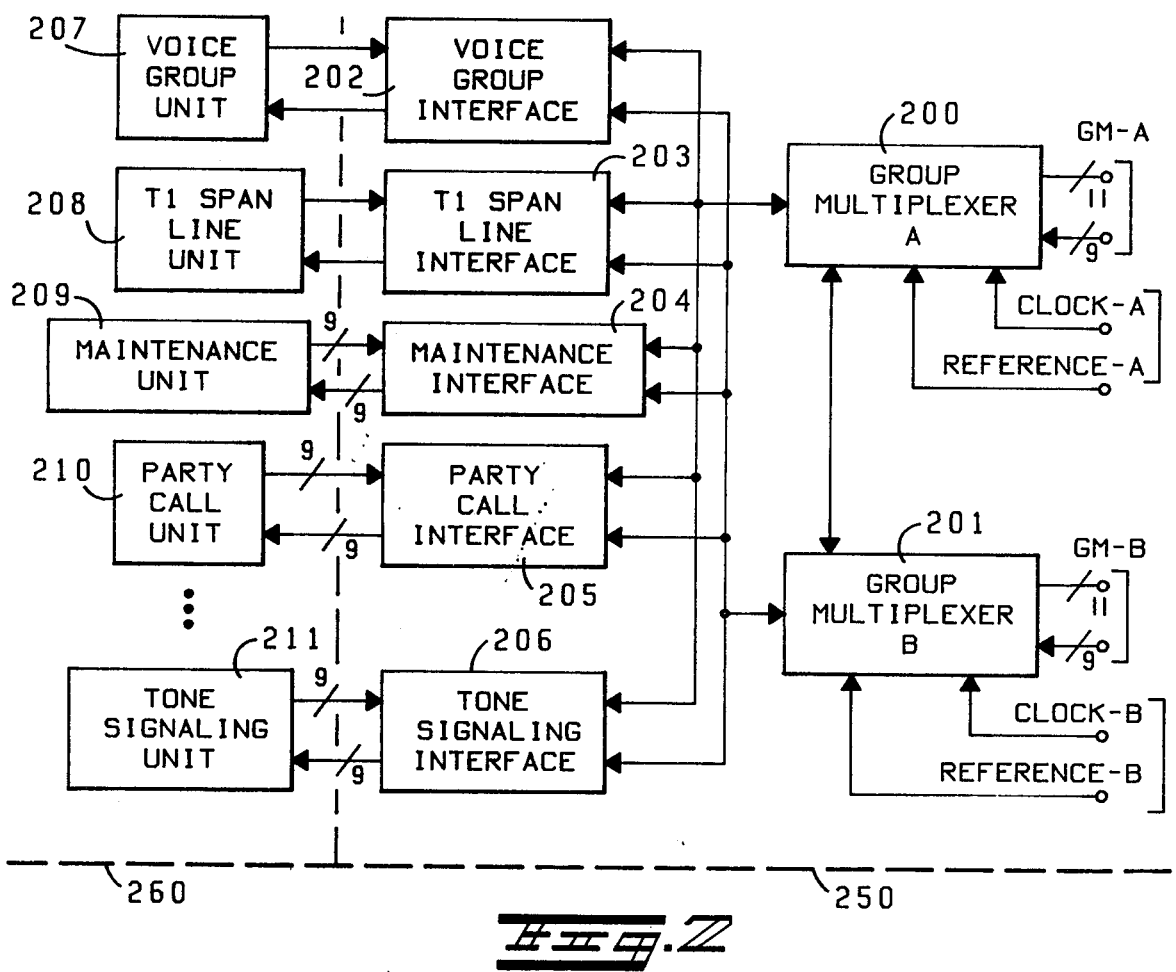
Fig. 2
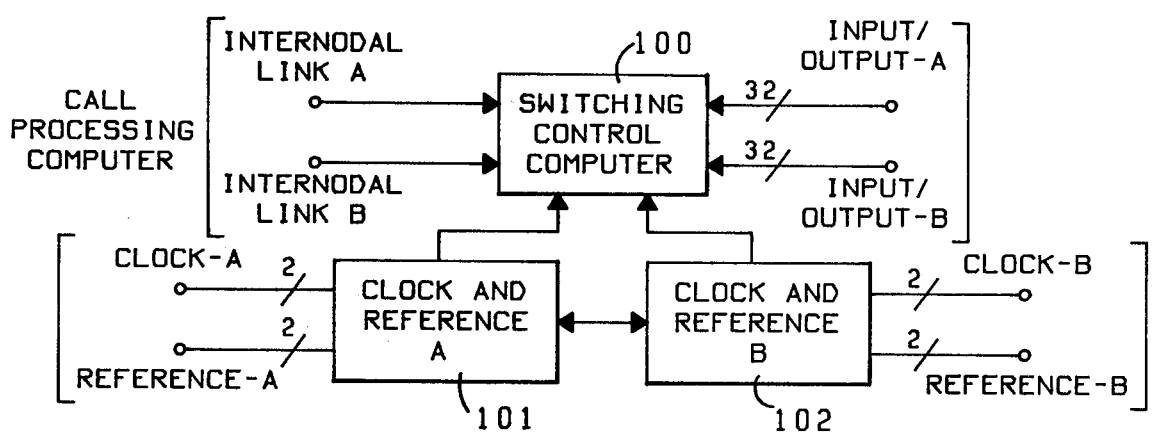
Fig. 12
Fig. 7
| FIG. 5 |
| FIG. 6 |

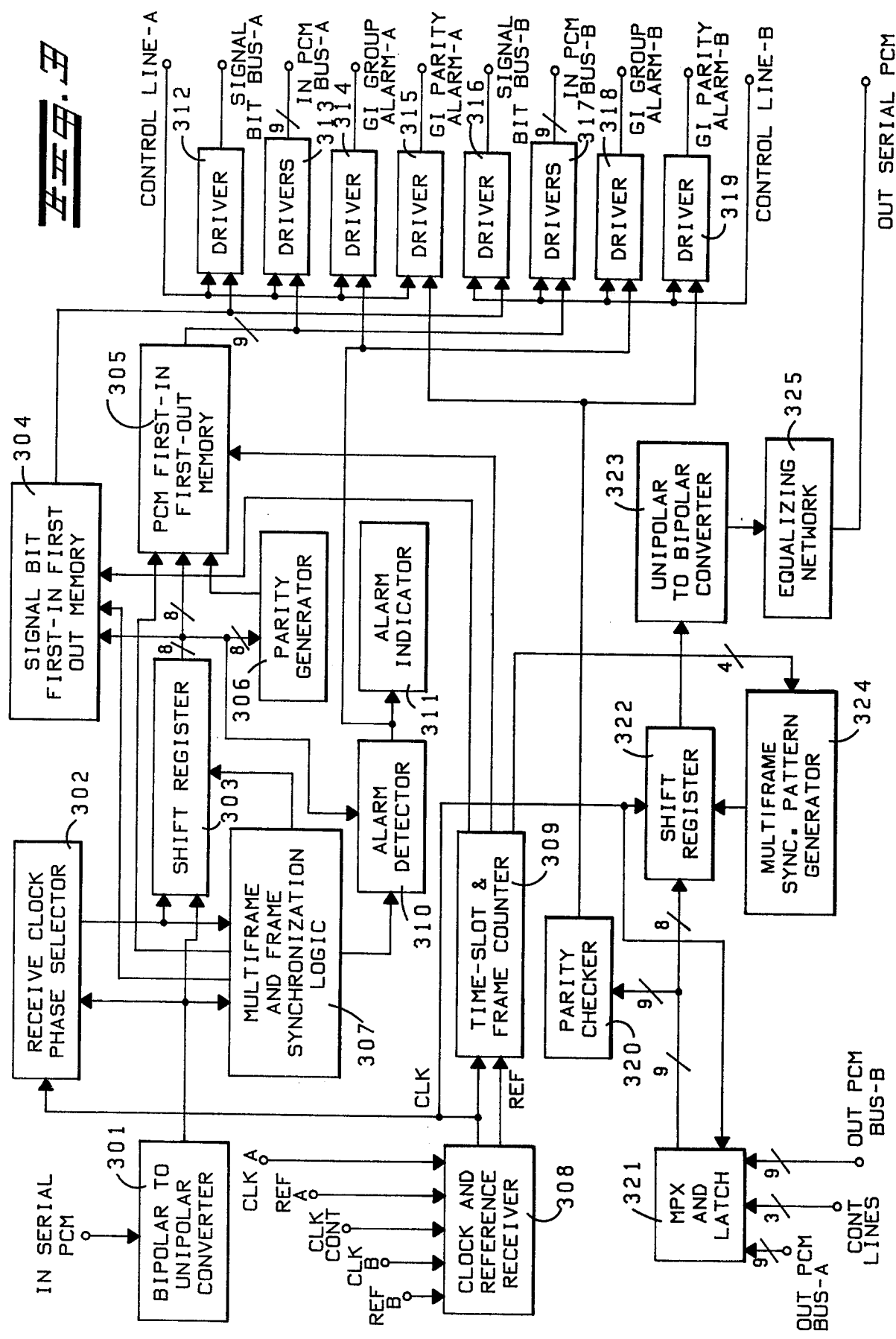

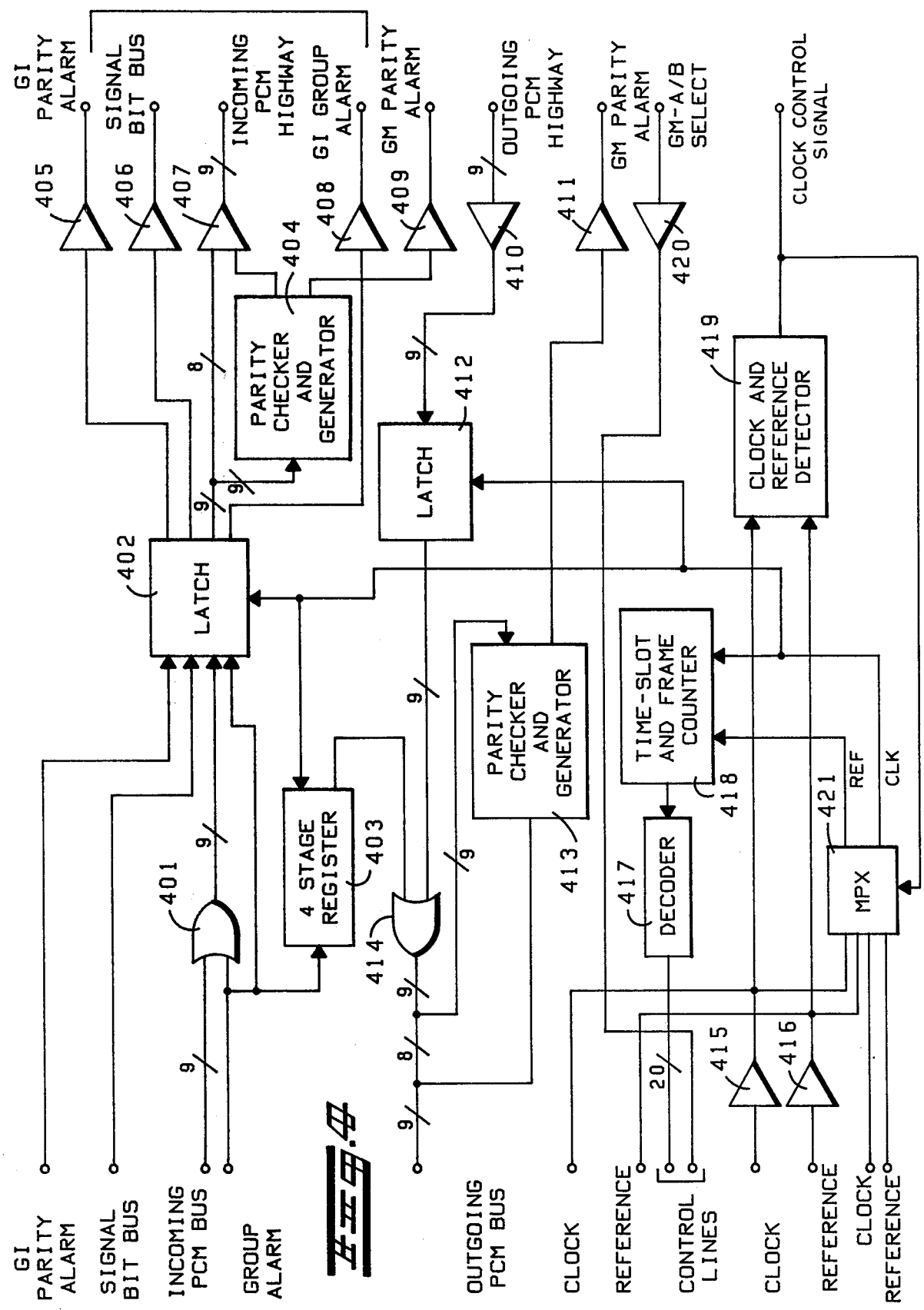

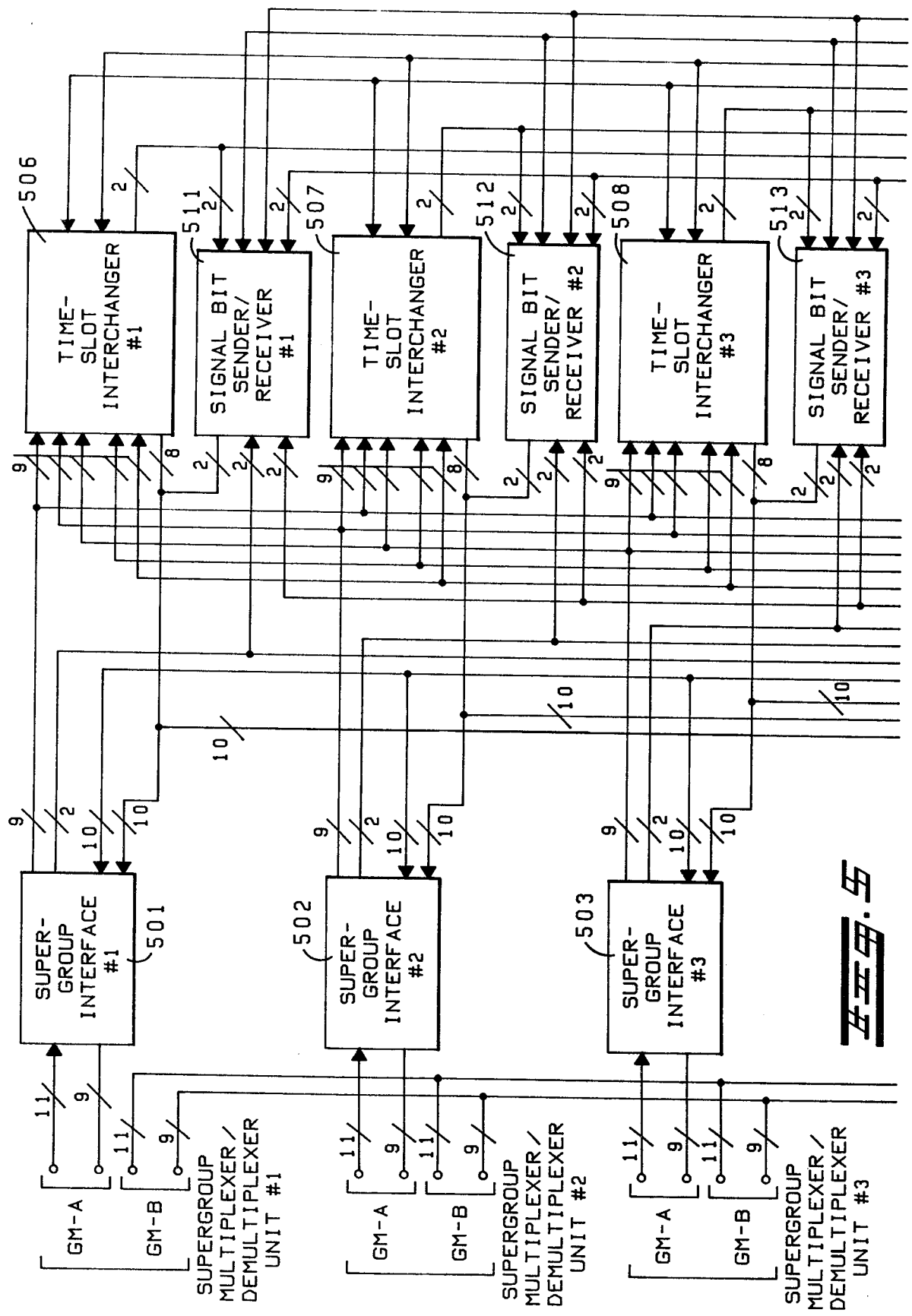

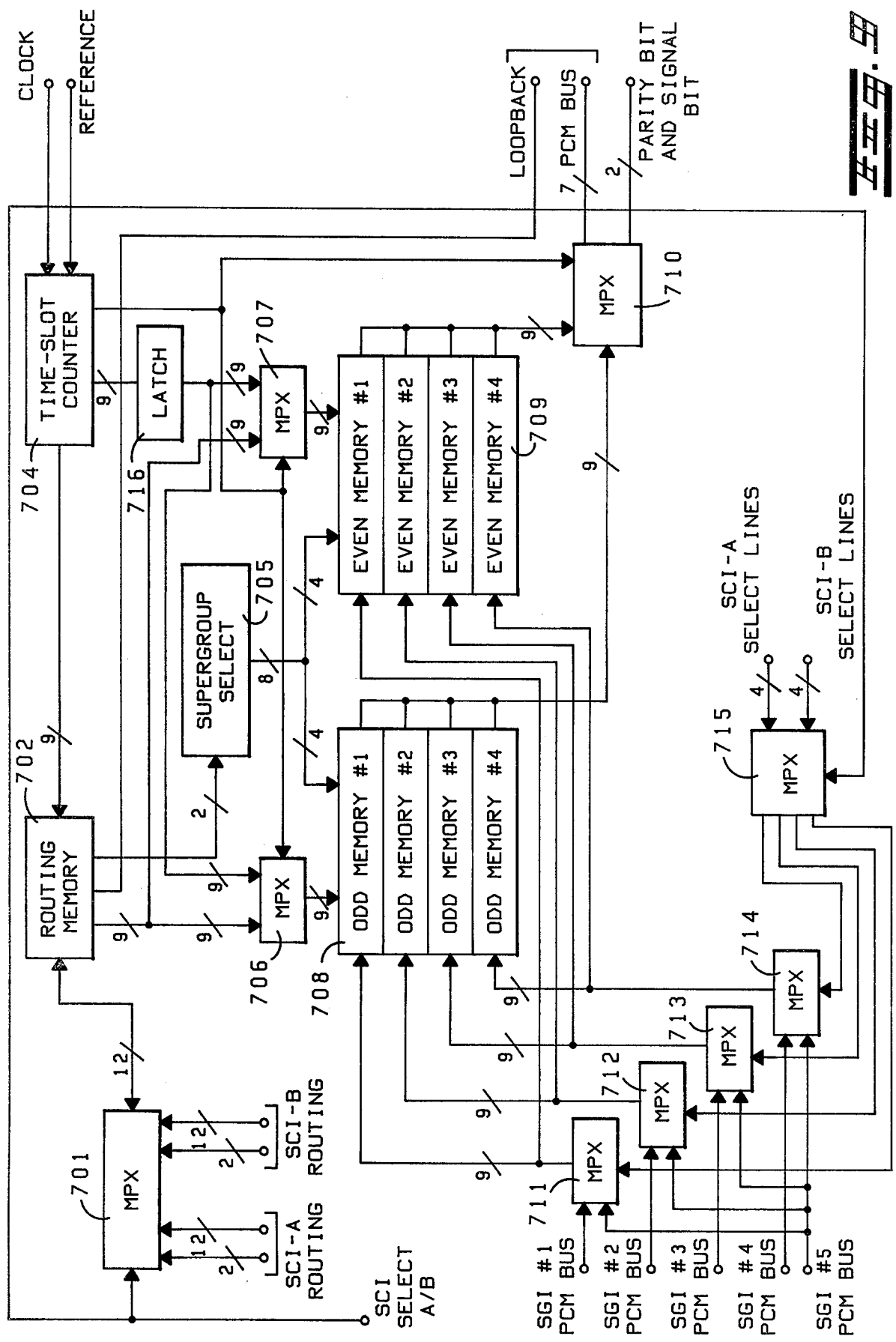

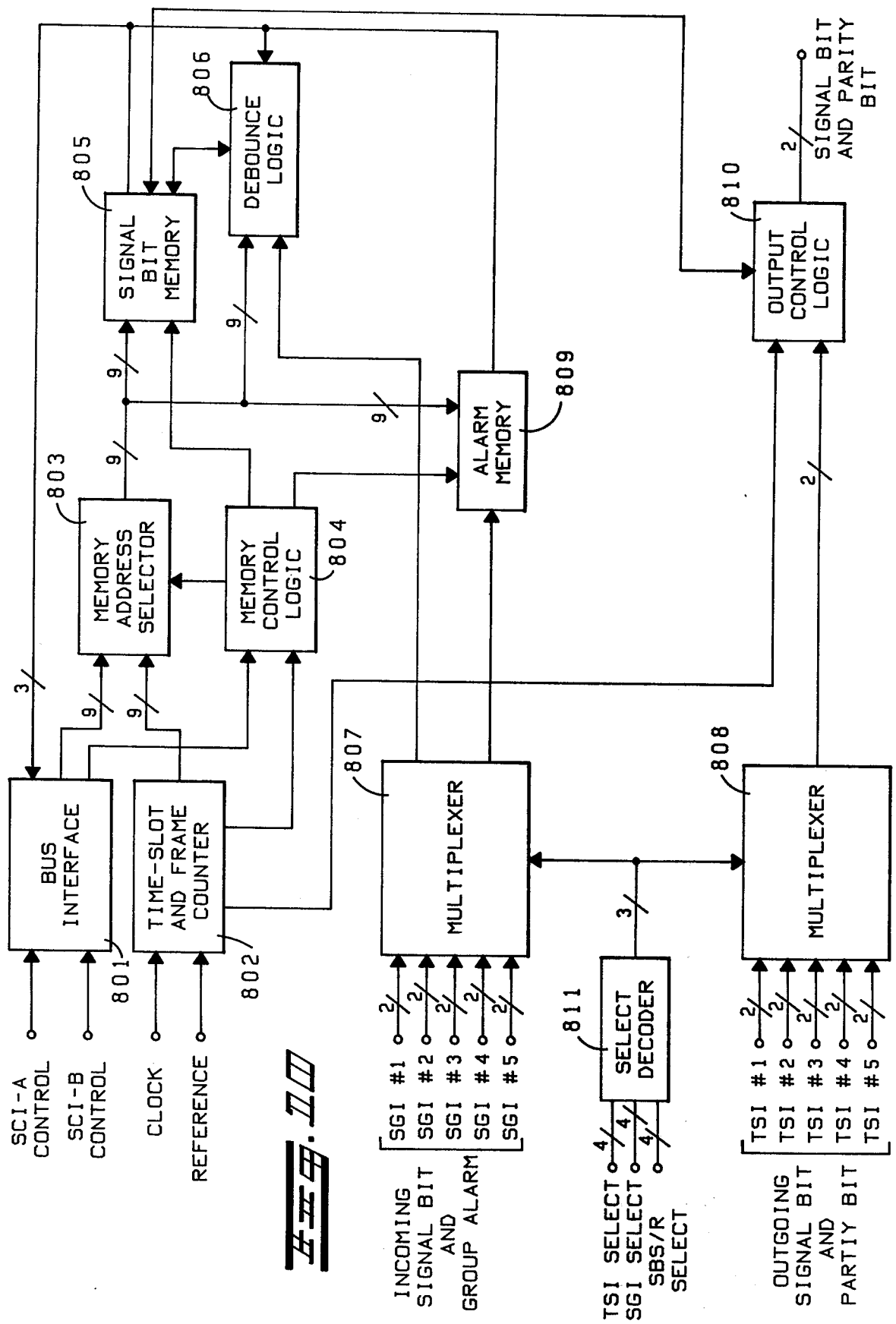

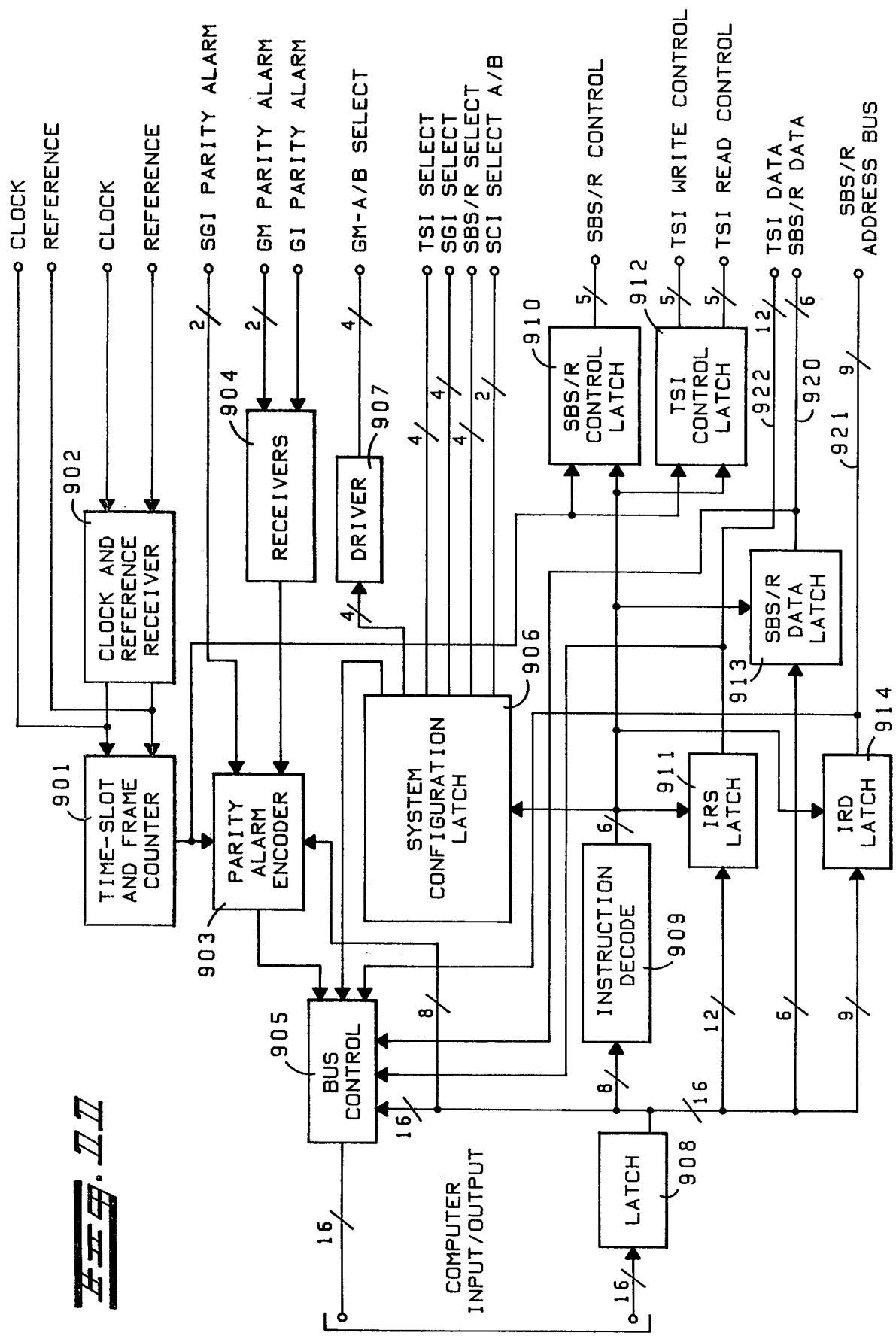

RADIOTELEPHONE COMMUNICATIONS SYSTEM

This application is a continuation-in-part of application Ser. No. 876,956, filed Feb. 13, 1978 and now abandoned.

RELATED APPLICATIONS

This application is related to the instant assignee's co-pending U.S. patent application, Ser. No. 876,955, entitled "A Radiotelephone Communication System" by Kevin M. Colosia et al and filed on the same date as the instant application.

BACKGROUND OF THE INVENTION

1. Field of the Invention

This invention relates to a method of and an apparatus for a telephone system for radiotelephone communications, and more particularly to an improved telephone system for radiotelephone communications utilizing pulse-code-modulation (PCM) techniques.

2. Description of the Prior Art

Prior art telephone systems for radiotelephone communications have included a single base station for covering a large service area, for example, an entire city, which is in turn connected to a telephone central office. The base station typically had a plurality of duplexed radio channels for providing radiotelephone service to a somewhat limited number of mobile radiotelephones in a densely populated city. Expansion of service to a large number of radiotelephones could only be accomplished by adding more radio channels to such radiotelephone systems. However, the number of radio channels for use in such radiotelephone systems is limited both by governmental regulation and the unavailability of other radio channels. As a result, more mobile radiotelephones had to be added to the existing system, thereby creating congestion on the system's limited number of radio channels.

The problems of the foregoing prior art telephone systems have been solved to some degree by improved radiotelephone systems utilizing a plurality of base stations located in geographical cells. The base stations are operated at relatively low power such that the radio channels assigned to a first base station can be reused by a second base station that is sufficiently distant from the first base station to prevent radio frequency interference. By reusing the available radio channels throughout a large geographical area, a greater number of mobile radiotelephones can be accommodated by such radiotelephone systems.

However, in order to control the operation of such radiotelephone systems, a more complex switching network is required that can handle a large number of remotely located base stations and a large number of mobile radiotelephones including both vehicular and hand-held or portable radiotelephones. In addition, it is highly desirable that the switching network is designed to be capable of providing to the mobile radiotelephones all the telephone service features which are presently available to land-line telephones. For example, these telephone service features include services such as repertory dialing, automatic call forwarding, and automatic conference calling. None of the prior art radiotelephone systems is capable of providing any of these features. Thus, prior art radiotelephone systems cannot accommodate a relatively large number of mobile radiotelephones nor provide the foregoing and similar automatic telephone service features to mobile radiotelephones.

For the foregoing and other shortcomings and problems, there exists a need for an improved telephone system for radiotelephone communications that is capable of handling a large number of base stations and mobile radiotelephones and capable of providing many different standard and unique service features to the mobile radiotelephones.

SUMMARY OF THE INVENTION

Accordingly, it is a general object of the present invention to provide an improved method of and apparatus for a telephone system for radiotelephone communications that provides mobile radiotelephones with substantially all the service features that are available to land-line telephones.

It is a further object of the present invention to provide an improved telephone system for radiotelephone communications that utilizes stored program control techniques for providing automatic telephone service to mobile radiotelephones.

It is a still further object of the present invention to provide an improved telephone system for radiotelephone communications that can accommodate a variety of radio signalling schemes.

It is still a further object of the present invention to provide an improved telephone system for radiotelephone communications that utilizes PCM digital switching techniques providing for switching between serial PCM bit streams.

It is still a further object of the present invention to provide an improved telephone system for radiotelephone communications that is a highly reliable and fully available nonblocking system.

It is a still further object of the present invention to provide an improved telephone system for radiotelephone communications that centrally processes PCM supervisory signalling.

It is yet a further object of the present invention to provide an improved telephone system for radiotelephone communications that may be modularly expanded to accommodate growth in the telephone system.

In accordance with the present invention, the aforementioned problems and shortcomings of the prior art are overcome and the above stated and other objects are attained by an improved telephone system for radiotelephone communications that includes a land-line telephone system including a land-line switching network for providing communication paths to a plurality of land-line telephones and a mobile radiotelephone system coupled to the land-line switching network for providing communications paths between mobile radiotelephones and between mobile radiotelephones and land-line telephones. It is to be understood that mobile radiotelephones include both vehicular and hand-held or portable radiotelephones.

The mobile radiotelephone system includes a plurality of base stations, a digital switching network, and PCM analog-to-digital (A/D) and digital-to-analog (D/A) converters. Each of the base stations provide communication paths to mobile radiotelephones in their respective coverage areas.

The digital switching network provides switching between a predetermined number of pairs of incoming and outgoing serial PCM bit streams. The incoming and outgoing serial PCM bit streams are time-division-multiplexed (TDM) bit streams that each have a plurality of frames containing a predetermined number of PCM channels, for example, 24 channels, each channel having corresponding message and signal bits. The predetermined number of PCM channels are repeated in each successive frame. A predetermined number of successive frames, for example, 12 frames, are organized into a multiframe.

The PCM A/D and D/A converters are interposed between the digital switching network and the respective base stations and between the digital switching network and the land-line switching network. The PCM A/D and D/A converters have analog ports coupled to the base stations and the landline switching network. Each analog port corresponds to a pre-established incoming and outgoing PCM channel. The PCM A/D and D/A converters interface to incoming and outgoing serial PCM bit streams from the digital switching network.

The digital switching network includes a multiplexer, time-slot-interchanger (TSI), and a demultiplexer. A predetermined number of the incoming serial PCM bit streams are mutliplexed by the multiplexer to provide an incoming parallel bit stream, which is likewise a TDM bit stream. The incoming parallel bit stream has a time slot corresponding to each PCM channel in the predetermined number of incoming serial PCM bit streams. The incoming PCM channels in the incoming parallel bit streams are interchanged by the TSI according to an ordering of time slots in a routing memory to provide an outgoing parallel bit stream. The outgoing parallel bit stream is demultiplexed by the demultiplexer to provide the predetermined number of outgoing serial PCM bit streams.

The digital switching network further includes an important signal processing feature that enables the centralized processing of the supervisory signal bits contained in the incoming and outgoing serial PCM bit streams. A signal detector senses the incoming signal bits from the incoming serial PCM bit streams for each of the respective incoming PCM channels. A signal processor is responsive to the sensed incoming signal bits for ordering the time slots in the routing memory to route incoming PCM channels to selected outgoing PCM channels. The TSI is responsive to the ordering of time slots in the routing memory for coupling incoming PCM channels to corresponding selected outgoing PCM channels. The signal processor is responsive to the sensed incoming signal bits for generating corresponding outgoing signal bits adapted to a pre-established format recognizable by the outgoing PCM channels. The outgoing signal bits are applied to the outgoing parallel bit stream which is coupled to the demultiplexer.

According to another feature of the present invention, the functions of the signal processor are provided by a computer having a stored program. The use of a stored program provides a great degree of flexibility, enabling the signal processor to be readily adapted to handle various formats of supervisory signalling sequences for the individual PCM channels and various PCM formats having different numbers of PCM channels, for example, 24 or 30 PCM channels in each serial PCM bit stream.

According to yet another feature of the present invention, an improved method is provided for processing signals through a digital switching network having a time-slot interchanger for switching incoming PCM channels from incoming to outgoing serial PCM bit streams in accordance with an ordering of time slots in a routing memory. The method includes improvement for processing the signal bits from the serial PCM bit streams, comprising the steps of: sensing incoming signal bits from the incoming serial PCM bit streams for each of the respective incoming PCM channels; ordering the time slots in the routing memory in response to the incoming signal bits; applying the ordering of time slots in the routing memory to the time-slot interchanger for enabling incoming PCM channels to be routed to selected outgoing PCM channels; and generating outgoing signal bits corresponding to the incoming signal bits but adapted to a pre-established format recognizable by the outgoing PCM channel.

Additional features, objects and advantages of the telephone system for radiotelephone communications in accordance with the present invention will be more clearly apprehended from the following detailed description together with the accompanying drawings.

BRIEF DESCRIPTION OF THE DRAWINGS

FIG. 1 shows a functional block diagram of a telephone system for radiotelephone communications embodying the present invention.

FIG. 3 shows a functional block diagram of the voice group interface shown in FIG. 2.

FIG. 4 shows a functional block diagram of the group multiplexer shown in FIG. 2.

FIGS. 5 and 6 when arranged in accordance with FIG. 7 show a functional block diagram of the PCM message and signal switching unit shown in FIG. 1.

FIG. 9 shows a functional block diagram of the time-slot interchanger shown in FIGS. 5 and 6.

FIG. 10 shows a functional block diagram of the signal bit sender/receiver shown in FIGS. 5 and 6.

FIG. 11 shows a functional block diagram of the switch computer interface shown in FIG. 6.

FIG. 12 shows a functional block diagram of the switching control unit shown in FIG. 1.

FIG. 13 shows a functional block diagram of another embodiment of the voice group interface shown in FIG. 2.

SUMMARY OUTLINE OF THE DESCRIPTION

Figure 2:
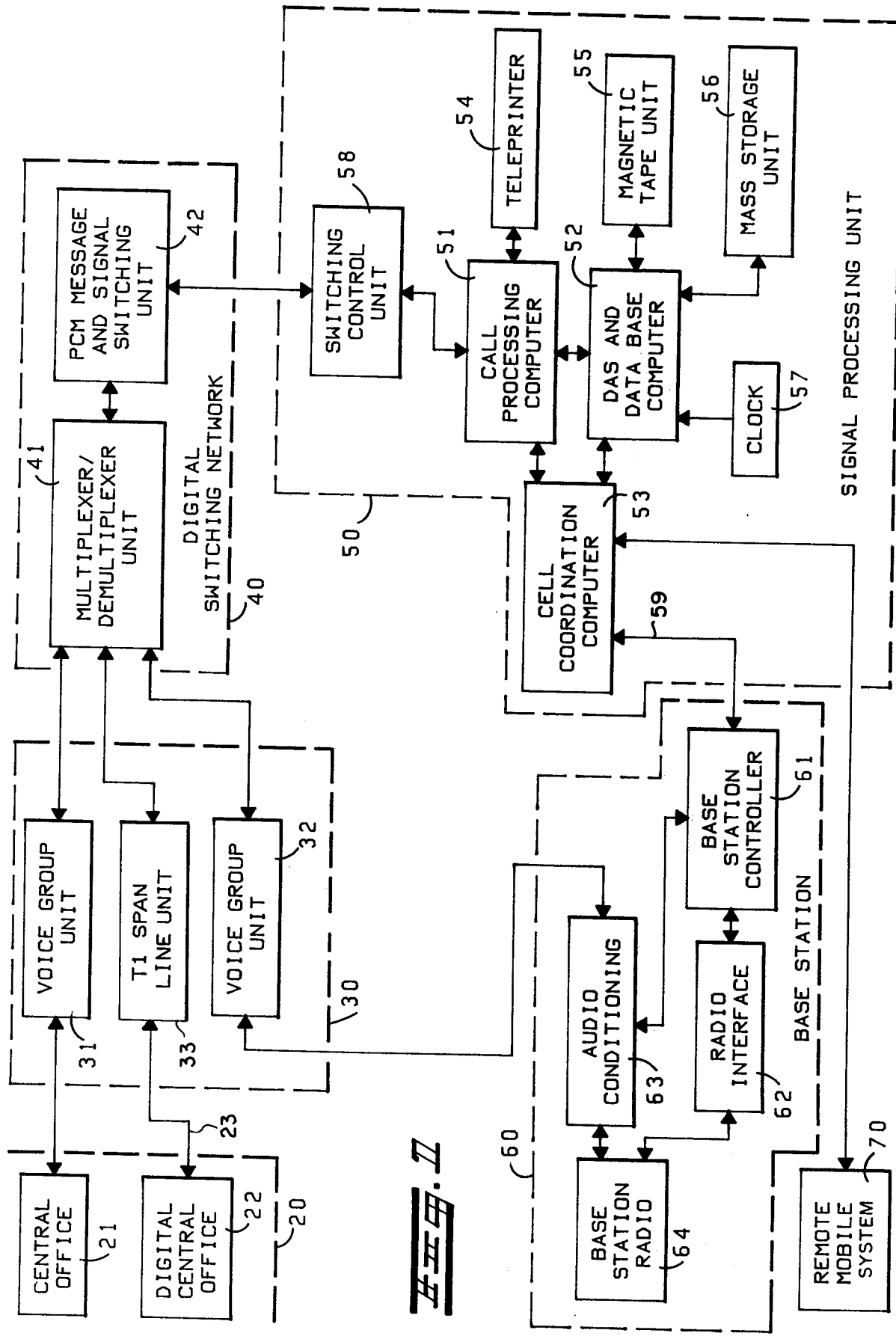
FIG. 2 shows a functional block diagram of the PCM A/D and D/A converters and the multiplexer/demultiplexer unit shown in FIG. 1.

I. System Description (FIG. 1)
A. General Description
B. System Architecture
II. Digital Switching Network (FIG. 2 and FIGS. 5-7)
A. Multiplexer/Demultiplexer Unit (FIG. 2)
  1. Voice Group Interface (FIGS. 3 and 13)
  2. Group Multiplexer (FIG. 4)
B. PCM Message and Signal Switching Unit (FIGS. 5-7)
  1. Supergroup Interface (FIG. 8)
  2. Time-Slot Interchanger (FIG. 9)
  3. Signal Bit Sender/Receiver (FIG. 10)
  4. Switch Computer Interface (FIG. 11)
III. Signal Processing Unit (FIGS. 1 and 12)

DESCRIPTION OF THE PREFERRED EMBODIMENT

I. System Description (FIG. 1)
A. General Description

A telephone system for radiotelephone communications in accordance with the present invention, as illustrated in FIG. 1, includes a land-line telephone system 20 for providing communication paths to a plurality of land-line telephones and a mobile radiotelephone system (30, 40, 50 and 60) coupled to the landline telephone system for providing communication paths among mobile or portable radiotelephone and land-line telephones. Such a mobile radiotelephone system may be organized in a number of different ways to provide the necessary mobile radiotelephone service for a metropolitan area including a number of adjacent cities or suburbs. Similarly, the mobile radiotelephone system may be organized to encompass a number of relatively distant large cities or the geographical area of an entire state. Also, the mobile radiotelephone system can be organized on a cellular basis wherein a geographical area is divided into a plurality of contiguous cells. Such a cellular telephone system is described in U.S. Pat. No. 3,906,166, entitled "Radio Telephone Systems", by Martin Cooper et al, issued Sept. 16, 1975 and assigned to the present assignee. The present invention can be advantageously applied to any of the aforementioned telephone systems for radiotelephone communications and to other telephone systems which may be devised by one skilled in the art without departing from the spirit and scope of the present invention.

The mobile radiotelephone system in accordance with the present invention includes a plurality of base stations 60, a digital switching network 40, PCM analog-to-digital (A/D) and digital-to-analog (D/A) converters 30, and a signal processing unit 50. The base stations 60 each provide communication paths to the mobile radiotelephones within their respective coverage area. The base stations 60 can be remotely located from the digital switching network 40 to accommodate the geographical requirements of the particular telephone system. The digital switching network 40 together with the signal processing unit 50 may be centrally located, for example, at a convenient location in close proximity to the land-line telephone system 20. The PCM A/D and D/A converters 30 are interposed between the digital switching network 40 and the respective base stations 60 and between the digital switching network 40 and the land-line telephone system 20. The PCM A/D and D/A converters 30 have analog ports coupled to the base stations 60 and the land-line telephone system 20 and provide for conversion of incoming and outgoing analog or voice information and supervisory signalling to incoming and outgoing serial PCM bit streams, respectively. The PCM A/D and D/A converters 30 may be centrally located with the digital switching network 40 or may be remotely located with the base stations 60 or the land-line telephone system 20.

The incoming and outgoing serial PCM bit streams from the PCM A/D and D/A converters 30 are applied to the digital switching network 40. Each of the serial PCM bit streams has a plurality of frames of a predetermined number of PCM channels that have message bits and signal bits. The message bits correspond to the analog or voice information for an analog port, and the signal bits correspond to the supervisory signalling for the analog port. The serial PCM bit streams may be organized according to two major international formats as recommended by the International Telegraph and Telephone Consultative Committee (CCITT). These formats are generally referred to as the 24 channel North American format (hereinafter "T1 format") and the 32 channel European format (hereinafter "European Format"). The CCITT has published the specifications of these two formats in the Green Book, Volume 3, Section 7, "Digital Transmission Systems", by the Fifth Plenary Assembly at Geneva, 1972, wherein the 24 channel format is specified by section Q.47 and the 32 channel format is specified by section Q.46.

According to both PCM formats, the analog ports are sampled at an 8 KHz rate, and the samples are digitized into 8 bit words. Each analog port is associated with a preestablished incoming and outgoing PCM channel. The 8 bit words or message bits for the analog ports are transmitted in the serial PCM bit streams in the position of the corresponding PCM channel for the respective analog port. Each serial PCM bit stream is formatted into consecutive frames of the 24 or 32 channels. Groups of consecutive frames are formatted into multiframes, a multiframe having twelve frames in the T1 format and sixteen frames in the European format.

In addition to the message bits, each PCM channel has corresponding signal bits representative of supervisory signalling for the corresponding analog ports. The signal bits for the PCM channels are transmitted in predetermined positions in the serial PCM bit streams in accordance with the particular PCM format.

The digital switching network 40 of the present invention provides a nonblocking digital network for switching PCM channels between the incoming and the outgoing serial PCM bit streams. The digital switching network may be configured to handle a predetermined number of incoming and outgoing serial PCM bit streams, for example, 64 incoming and 64 outgoing serial PCM bit streams from a corresponding number of PCM A/D and D/A converters 30. Groups of serial PCM bit streams including, for example, 16 such bit streams are time-divisionmultiplexed (TDM) to provide parallel bit streams, having a pre-established time slot for each PCM channel from the group of serial PCM bit streams. There is a corresponding outgoing parallel bit stream for the incoming parallel bit stream. The incoming PCM channels of the incoming parallel bit stream are interchanged by the digital switching network 40 according to an ordering of time slots in the routing memory to provide the outgoing parallel bit stream.

The signal processing unit 50 of the present invention provides for the centralized processing of the supervisory signalling carried in the serial PCM bit streams. The incoming supervisory signalling for each incoming PCM channel is sensed by the signal processing unit 50 and utilized to provide the ordering of time slots and the outgoing supervisory signalling for the digital switching network 40. All supervisory signalling from the base stations 60 and the land-line telephone system 20 can be carried in the serial PCM bit streams.

B. System Architecture

An exemplary embodiment of a telephone system for radiotelephone communications in accordance with the present invention is shown in FIG. 1. The land-line telephone system 20 includes land-line switching networks which may be central offices 21 having analog trunk circuits and digital central offices 22 having digital PCM trunk circuits. The mobile radiotelephone system includes the PCM A/D and D/A converters 30, the switching control unit 40, the signal processing unit 50, and a plurality of base stations 60. The mobile radiotelephone system may also be coupled to one or more remote mobile radiotelephone systems 70 located in a distant geographical area, for example, in an adjacent state or in another country.

The telephone system for radiotelephone communications illustrated in FIG. 1 is particularly well-adapted for use in a cellular radiotelephone system, such as that described in the aforementioned U.S. Pat. No. 3,906,166. The base station 60 may be geographically located in the particular cells. The base station 60 includes a base station radio 64 operable on a plurality of radio channels, audio conditioning 63, radio interface 62, and base station controller 61. The base station controller 61 controls the operation of the base station 64 to provide the particular mobile signalling format to be used for communicating with the mobile radiotelephones. The base station controller 61 will typically include a computer system for providing the necessary functions for operation of the base station radio 64. Necessary control signals from the base station controller 61 are applied to the audio conditioning 63 and via the radio interface 62 to the base station radio 64. The transmitter and receiver audio from the base station radio 64 are suitably conditioned by the audio conditioning 63 for application directly or via land-lines to the PCM A/D and D/A converters 30.

The PCM A/D and D/A converters 30 are interposed between the digital switching network 40 and the land-line telephone system 20 and the base stations 60. The PCM A/D and D/A converters 30 provide for conversion of analog information and supervisory signalling for the analog ports to incoming and outgoing serial PCM bit streams. The T1 format is utilized in the exemplary embodiment of the PCM A/D and D/A converters 30. The PCM A/D and D/A converters 30 include a number of voice group units 31 and 32. The voice group units 31 and 32 are adapted to accept 24 analog ports and a pair of incoming and outgoing serial PCM bit streams. The voice group units 31 and 32 can be provided by a number of commercially available units, for example, such as the unit described in the "Operation-Installation-Maintenance Manual for T324 PCM Carrier System", Publication No. 650038-823-001, published by the Transmission Department of International Telephone and Telegraph Telecommunications, 1976. The voice group units 31 and 32 are commonly referred to as "PCM channel banks" by those skilled in the art.

The digital central office 22 is coupled to the digital switching network 40 by a digital PCM trunk 23 having a single pair of incoming and outgoing serial PCM signals, commonly referred to as a "T1 span line" by those skilled in the art. If the digital switching network 40 is clock synchronized to the digital central office 22, the T1 span line 23 may be directly coupled to the digital switching network 40, otherwise the T1 span line 23 is coupled to T1 span line unit 33. The T1 span line 23 provides an entirely digital link that is equivalent to twenty-four analog ports in the central office 21, thus resulting in a significant reduction in requisite interconnecting lines and equipment.

The digital switching network 40 interfaces with the PCM A/D and D/A converters 30 only by means of the pairs of incoming and outgoing serial PCM bit streams. Since supervisory signalling for the analog ports is carried in the incoming and outgoing serial PCM bit streams, further interface between the PCM A/D and D/A converters 30 and the digital switching network 40 is not required. The digital switching network 40 together with the signal processing unit 50 can be centrally located and interconnected with remotely located PCM A/D and D/A converters 30 by T1 span lines provided in the land-line network.

The digital switching network 40 includes a multiplexer/demultiplexer unit 41 and a PCM message and signal switching unit 42. A pair of incoming and outgoing PCM bit streams may be termed a "T1" bit stream. The multiplexer/demultiplexer unit 41 receives a predetermined number of T1 bit parallel streams bits and provides an outgoing parallel bit stream, for example, 64 T1 bit streams in the preferred embodiment, and controls the multiplexing and demultiplexing of the serial bit streams into parallel bit streams. The PCM message and signal switching unit 42 receives the incoming stream by interchanging the incoming PCM channels in the incoming parallel bit stream according to an ordering of time slots in a routing memory.

The call processing unit 50 includes the switching control unit 58, the call processing computer 51, the cell coordination computer 53, the data-acquisition-system (DAS) and data base computer 52, and various peripheral units 54–57 for the computers. Each of the blocks, 51, 52, 53 and 58 of the signal processing unit 50 are controlled by a computer having a stored program for providing the functions of the respective blocks. The computers may be any of a number of commercially available computers or microcomputers such as the Motorola M6800 computer system. The supervisory signalling from all of the analog ports in the telephone system is monitored by the switching control unit 58 and appropriately forwarded to the call processing computer 51. For example, supervisory status indicated by the supervisory signalling may reflect on-hook and off-hook conditions, dialing conditions, call progress conditions, alarm conditions and other telephone system conditions.

The supervisory status of the analog ports coupled to the telephone system is determined by the switching control unit 58 by sensing the incoming signal bits for the corresponding incoming PCM channels from the incoming serial PCM bit streams. The logical state of the incoming signal bits for each PCM channel provide on-hook, off-hook, dialing and other supervisory information. The supervisory status is determined from the incoming signal bits and then passed on to the call processing computer 51 for further processing. The call processing computer 51 receives the dialing and other information required to complete a particular call and verifies it through the DAS and data base computer 52. The information maintained by the DAS and data base computer 52 includes mobile and portable subscriber number files, the telephone system dialing plan, the telephone system configuration plan, and operational parameters of the mobile telephone network such as the number of base stations.

In order to control a highly complex cellular mobile network, the cell coordination computer 53 may require a direct data link 59 to the respective base station controllers 61. This data link may be provided via a dedicated modem link or via a digital port to the voice group unit 32. The digital port to the voice group unit 32 may be configured to occupy the position of one analog port and therefore provide up to a 64,000 bits-per-second data channel.

The cell coordination computer 53 supervises the establishment of communication paths between the base station 60 and the mobile radiotelephones. Thus the processing of a call is shared between the call processing computer 51 and the cell coordination computer 53. For example, upon ascertaining verification of a dialed number received from a port coupled to the telephone system and directed to a mobile radiotelephone and the availability of a base-station radio channel, the call processing computer 51 routes the telephone system port to the radio-channel port for completion of the call. The assigned radio-channel port is transferred from the call processing computer 51 to the switching control unit 58 which orders the channel time slots in the routing memory in order to complete the connection. The ordering of time slots in the routing memory enables the TSI to couple the incoming PCM channel for the telephone-system port to the outgoing PCM channel for the radio-channel port and the incoming PCM channel for the radio-channel port to the outgoing PCM channel for the telephone-system port. Next, outgoing signal bits adapted to the format of the radio-channel port are transmitted by the switching control unit to the outgoing PCM channel for the radio-channel port. For example, an incoming dialed number after number translation may be truncated since not all digits are required for the identification number of the mobile radiotelephone.

Thus, in order to establish a two-way connection between two analog ports, the switching control unit 51 provides two ordered time slots in the routing memory. For providing supervisory tones, such as dial tone, to an analog port, only a one-way connection is required. The outgoing PCM channel to the analog port is coupled to the incoming PCM channel for dial tone, requiring that the switching control unit provide one ordered time slot in the routing memory to complete the one-way connection.

II. Digital Switching Network (FIG. 2 and FIGS. 5-7)

Figure 6:
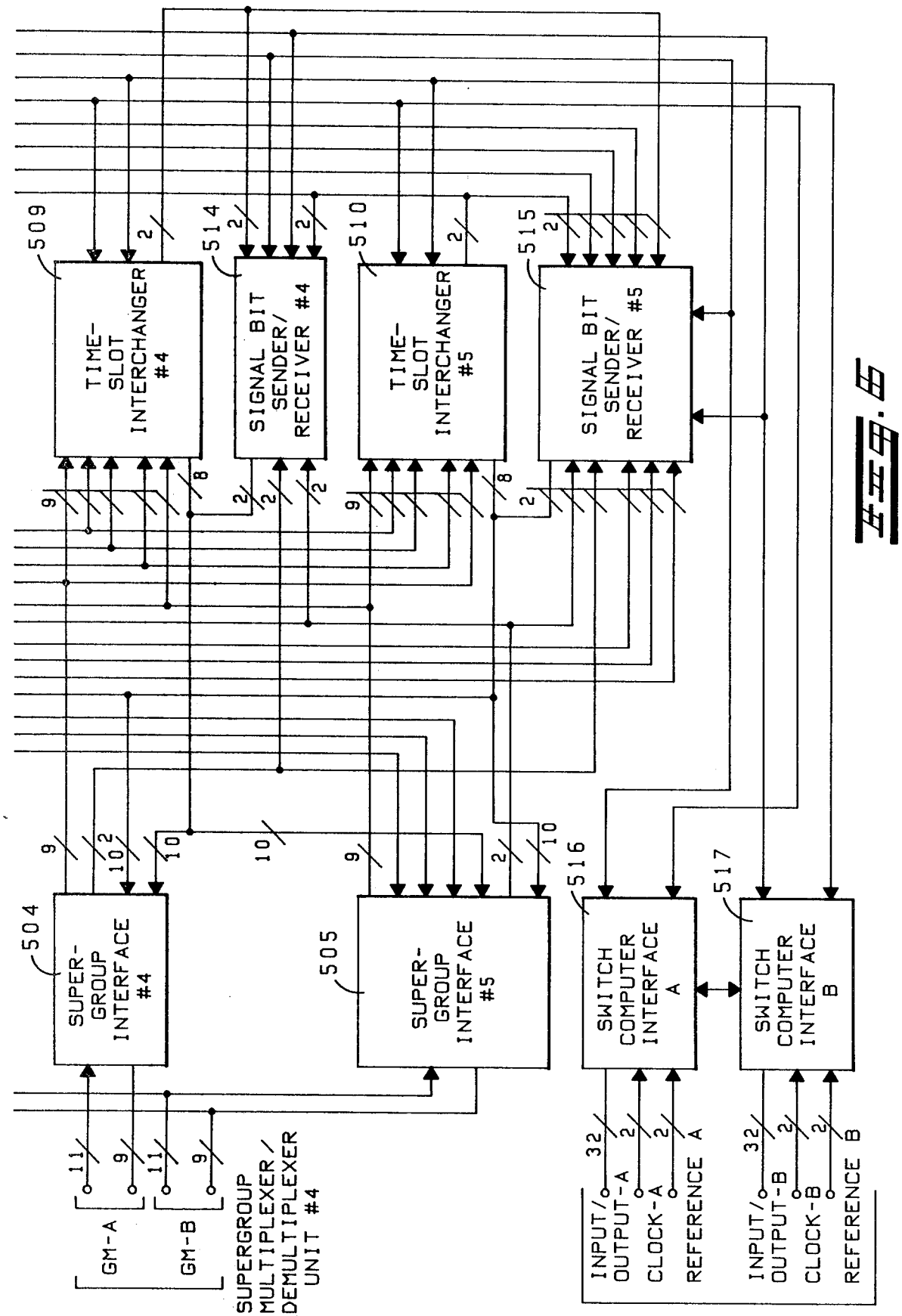

The functional organization of the digital switching network is illustrated in more detail by the functional block diagrams for the multiplexer/demultiplexer unit shown in FIG. 2 and the PCM message and signal switching unit shown in FIGS. 5 and 6 arranged in accordance with FIG. 7. The preferred embodiment of the digital switching network is based on the T1 format.

Each pair of incoming and outgoing serial PCM bit streams, or T1 bit streams are clock synchronized to the digital switching network. According to the T1 format, the T1 bit streams are transmitted at a frequency of 1.544 MHz. The exemplary embodiment of the digital switching network of the present invention is organized into four blocks which each receive 16 T1 bit streams. Thus, the digital switching system is capable of switching 1536 PCM channels organized into four blocks of 384 channels each.

Each port to the PCM A/D and D/A converters is allocated to a fixed incoming and outgoing PCM channel. During each PCM frame of 125 microseconds, there are for each block a total of 386 channel time slots, numbered sequentially 1 through 386, of which 384 are used for active PCM channels. The extra time slots are related to the framing bit of the T1 bit stream and are not usable. Thus each port to the PCM A/D and D/A converters has a dedicated time slot of the 384 time slots in one of the four blocks of the digital switching network. For example, time-slot number 185 of block number one is associated with a particular analog port. The incoming message bits for the incoming PCM channel from the particular analog port are in time-slot number 185 in the incoming parallel bit stream of block one, and outgoing message bits for the corresponding outgoing PCM channel to the analog port are in time-slot 185 in the outgoing parallel bit stream of block one.

The T1 bit streams are coupled to the multiplexer/demultiplexer unit 41 (see FIG. 1) of the digital switching network 40. The multiplexer/demultiplexer unit 41 is divided into four blocks, each of which interface with 16 T1 bit streams. The PCM message and signal switching unit 42 is also essentially divided into four blocks, each of which is coupled to a corresponding block of the multiplexer/demultiplexer unit 41. In addition, a spare block is provided in the PCM message and signal switching unit 42 which is switchable to operate as any one of the other four blocks therein. Switching of the spare block of the PCM message and signal switching unit 42 is performed automatically in response to a fault in one of the other four block therein. Each of the blocks of the PCM message and signal switching unit 42 receive all incoming PCM channels from the possible 64 T1 bit streams. The digital network is fully nonblocking, since each block of the PCM message and signal switching unit 42 receives all of the incoming PCM channels, which are then available for transmission to the outgoing PCM channels of the corresponding 16 T1 lines for the particular block.

A. Multiplexer/Demultiplexer Unit (FIG. 2)

Referring to FIG. 2, a block diagram of the PCM group units 260 and the multiplexer/demultiplexer unit 250 is shown. The multiplexer/demultiplexer unit 250 includes a group multiplexer-A (200), a group multiplexer-B (201), and up to 16 group interfaces 202–206. Each multiplexer/demultiplexer unit 250 is capable of handling a supergroup or 16 T1 lines. Two group multiplexers 200 and 201 are provided to increase the reliability of the telephone system. A failure in either one of the group multiplexers 200 and 201 will cause automatic switching to the other. Each group multiplexer 200 and 201 provides for identical parallel incoming and outgoing bit streams that are coupled to the PCM message and signal switching unit.

The group interfaces 202–206 interface the bit streams from corresponding units 207–211, respectively, to separate buses coupled to the group multiplexers 200 and 201. Each group interface 202–206 multiplexes and demultiplexes PCM channels to and from the separate shared buses in response to multiplex signals from each group multiplexer 200 and 201. Each group interface 202–206 has a time period for placing and a time period for receiving parallel PCM bit streams to and from the shared buses, respectively, coupled to the group multiplexers 200 and 201. Both group multiplexers 200 and 201 are operating in synchronism. Group multiplexer A (200) is the primary unit, coupled to a dedicated block in the PCM message and signal switching unit. Group multiplexer B (201) is the secondary unit coupled to the spare block of the PCM message and signal switching unit.

Two of the group interfaces 202 and 203 interface with serial T1 bit streams, while the other three group interfaces 204–206 interface with parallel PCM bit streams. The voice group interface 202 is coupled to a voice group unit 207 which may be any of a number of commercially available PCM channel banks such as the carrier unit described in "Operation-Installation-Maintenance Manual for T324 PCM Carrier System", Publication No. 650038-823-001, published by the Transmission Department of International Telephone and Telegraph Telecommunications, 1976. The voice group unit 207 provides for conversion between 24 analog ports and the corresponding serial T1 bit stream.

A span line interface 203 is coupled to a span line unit 208, which may be any of a number of commercially available T1 span line terminations. The span line unit 208 may be coupled directly or through a series of T1 span line repeaters to the digital central office 22 (see FIG. 1).

The maintenance interface 204 is coupled to a maintenance unit 209, which is a diagnostic support unit for the digital switching network. The maintenance interface 204 provides a nine bit incoming parallel PCM bit stream, including eight message bits and one parity bit, and receives a nine bit outgoing parallel PCM bit stream. The party call interface 205 and the tone signalling interface 206 provide and receive similar parallel PCM bit streams. The party call interface 205 is coupled to a party call unit 210, which provides for party or conference calls between 3 parties. Party call unit 210 combines the received outgoing PCM channels according to any of a number of conventional manners and provides incoming PCM channels representative of appropriate combinations of the outgoing PCM channels. The tone signalling interface 206 is coupled to the tone signalling unit 211, which includes digital tone detection circuitry for detecting various formats of incoming multi-frequency signalling and digital tone generating circuitry for providing outgoing multi-frequency signalling and a number of audible or progress tones, such as dial tone, busy tone, and congestion tone, for the telephone system.

1. Voice Group Interface (FIGS. 3 and 13)

The operation of voice group interface illustrated in FIG. 3 is representative of the general principles of operation used by the various group interfaces (GI's) included in the multiplexer/demultiplexer unit. The voice group interface receives a serial T1 bit stream and provides for incoming and outgoing parallel bit streams to the group multiplexer. The serial T1 bit stream from the voice group unit is clock synchronized to the digital switching network by configuring the voice group unit to operate with the clock signal recovered from the outgoing serial PCM bit stream from the digital switching network. Operation with the recovered clock is provided on most commercially available voice group units similar to the above-referenced T234 Carrier System.

The functional block diagram shown in FIG. 3, and likewise those in FIG. 4, FIG. 8, FIG. 9, FIG. 10 and FIG. 11, are functional representations of conventional logic blocks and circuitry. One skilled in the art can implement the logic circuitry of the functional blocks from combinations of integrated circuits such as those described in "The TTL Data Book for Design Engineers", Second Edition, published by Texas Instruments, Inc., 1976, utilizing conventional design techniques such as those described in "Logic Design of Digital Systems", by D. L. Dietmeyer and published by Allyn & Bacon, Inc., 1971.

The incoming serial PCM bit stream from the voice group unit is applied to the bipolar to unipolar converter 301 which provides a unipolar logic output to the receive clock phase selector 302, shift register 303, and the multiframe and frame synchronization logic 307. The message bits for each consecutive PCM channel in the incoming serial PCM bit stream are serially clocked into the shift register 303 under the control of the receive clock phase selector 302. The receive clock phase selector 302 provides a clock signal which accommodates up to a predetermined amount of clock skew in the incoming serial PCM bit stream.

The multiframe and frame synchronization logic 307 detects the framing bits in the incoming serial PCM bit stream in order to determine the start of each frame and multiframe. The alarm detector 310 checks the digital pattern of the detected frame bits for the presence of the proper bit sequence for the T1 format. The alarm detector 310 also receives bit two, the second most significant bit, of the PCM message bits from the shift register 303, which, if a logic zero for an entire frame, indicates an alarm from the voice group unit. If the proper bit sequence is not detected or an alarm from the voice group unit is detected, the alarm detector 310 activates the alarm indicator 311 and provides a group alarm indication to tri-state drivers 314 and 318.

Once incoming frame and multiframe synchronization has been obtained, the message bits for each PCM channel, which are serially shifted into the shift register 303, are sequentially transferred in parallel into the PCM first-in and first-out (FIFO) memory 305. The PCM FIFO memory 305 provides for the storage of at least one frame or 24 PCM channels each having 9 message bits including one parity bit. Any conventional FIFO memory that is at least 24×9, or 24 words by 9 bits, would be satisfactory. However, availability and operational limitations of conventional FIFO memories may necessitate provision of additional storage. The PCM FIFO memory 305 is loaded starting at the beginning of a frame with the nine message bits of the first PCM channel and thereafter with the message bits of the successive PCM channels. Thus, the first time that the PCM FIFO memory 305 is read out, the first PCM channel of a frame is accessed. Since the frame sequence of the digital switching network is not aligned or synchronized to the frame sequence of the incoming serial PCM bit stream, the PCM FIFO memory 305 is configured to store at least the message bits of the 24 channels in a frame since the respective frame sequence may be misaligned by an entire frame. The incoming PCM channels are read out of the PCM FIFO memory 305 under control of the system frame sequence from the time-slot and frame counter 309 and then applied to the driver 313 and 317.

The parity generator 306 generates a parity bit from the eight message bits for each PCM channel which is stored together with the message bits in the PCM FIFO memory 305. Parity is maintained on the message bits for each PCM channel throughout the digital switching network.

According to the T1 format, signal bits for each channel are contained in the sixth and twelfth frames of each multiframe. In these respective frames, the least significant bit of the eight message bits for each PCM channel is a signal bit. During these respective frames of the incoming PCM bit stream, the signal bit for each channel is stored in the signal bit first-in first-out (FIFO) memory 304. The signal bit FIFO memory 304 provides for storage of at least the 48 signal bits for one multiframe. The signal bits are entered into the signal bit FIFO memory 304 in the exact order that they are received from the incoming serial PCM bit stream. The signal bits are subsequently read out of the signal bit FIFO memory 304 in accordance with frame 6 and 12 from the time-slot and frame counter 309. Thus, the incoming signal bits are read out of the signal bit FIFO memory 304 and applied to the drivers 312 and 216 in accordance with the multiframe sequence of the digital switching network.

Control line A provided by group multiplexer A enables the tri-state drivers 312-315 to gate out their respective input signals to the shared buses at the proper time slots for multiplexing the respective input signals for each PCM channel to group multiplexer A. Similarly, control line B provided by group multiplexer B is applied to tri-state drivers 316-319 for gating their input signals to the shared buses at the respective time slots for multiplexing the respective input signals for each PCM channel group multiplexer B.

The clock and reference receiver 308 selects between clock and reference A and clock and reference B in response to the clock control signal from the primary group multiplexer (see Sec. II A.2). The selected clock and reference signals are then applied to the various blocks of the voice group interface. Time-slot and frame counter 309 provides timing and control signals synchronized with the framing sequence of the digital switching network by the received reference signal. The reference signal is utilized to preset the time-slot and frame counter 309 to a predetermined state for proper alignment with the system multiframe sequence.

The multiplexer and latch 321 latches message bits for each outgoing PCM channel from the shared bus from group multiplexer A or group multiplexer B as directed by control signals from the group multiplexers. The latched message bits for each outgoing PCM channel are loaded into shift register 322 and applied to parity checker 320. If the parity bit from the multiplexer and latch 321 does not agree with the generated parity bit, the parity checker 320 provides a GI parity alarm signal which is applied to driver 315 and driver 319.

The message bits loaded to shift register 322 are serially shifted out to a unipolar to bipolar converter 323. Framing bits are added to the shift register 322 by the multiframe synchronization pattern generator 324. According to the T1 format, a framing bit is added for each frame in a predetermined bit sequence for defining a multiframe. The unipolar to bipolar converter 323 converts the serial bit stream from shift register 322 to a bipolar serial PCM bit stream which is applied to equalizing network 325. The equalizing network 325 provides impedance matching to the line over which the outgoing serial PCM bit stream is transmitted.

In FIG. 13, there is illustrated another embodiment of the voice group interface, where the receive clock phase selector 302 of FIG. 3 has been replaced by the receive clock recovery circuit 350. In some instances, it is necessary to recover the incoming clock signal from the incoming serial PCM bit stream, such as, for example, when a voice group unit is not transmitting its incoming serial PCM bit stream with a clock signal recovered from the outgoing serial PCM bit stream from the digital switching network. Most commercially available voice group units may transmit their serial PCM bit streams with an internally generated clock signal, which may be both phase and frequency locked to a recovered clock signal as in FIG. 3, or which may be frequency locked only to a recovered clock signal, or which my be based on a highly accurate, internal atomic oscillator.

In order to accommodate these commercially available voice group units, the receive clock recovery circuit 350 is coupled to the incoming serial PCM bit stream from the bipolar to unipolar converter 301 and provides a recovered incoming clock signal to shift register 303 and multiframe and frame synchronization logic 307. The receive clock recovery circuit 350 may be similar to the clock recovery circuitry provided on most commercially available voice group units similar to the above-referenced T234 Carrier System.

Ideally, the recovered clock signal provided by the receive clock recovery circuit 350 is the same frequency as the system clock signal provided by the clock and reference receiver 308. Minor frequency differences between the recovered and system clock signals which average out over time are accomodated by the FIFO memories 304 and 305. However, if, over a long period of time, the recovered clock signal is slightly higher, or slightly lower, in frequency than the system clock signal, the FIFO memories 304 and 305 may overflow, or become empty, respectively. Most commercially available FIFO memories provide an overflow/empty output signal 351 and 352 when such a condition occurs. Upon detection of an overflow or empty condition, the overflow/empty output 351 and 352 of the FIFO memories 305 and 304 may be coupled to the master reset input for clearing the FIFO memories of all stored signals. If the FIFO memories were not cleared upon detection of an overflow or empty condition, the order of the stored message bits and signal bits would be disturbed resulting in the loss of synchronization to the incoming serial PCM bit stream.

The remaining blocks of the voice group interface of FIG. 13 operate identically to corresponding blocks of FIG. 3.

2. Group Multiplexer (FIG. 4)

The group multiplexer (GM) controls the multiplexing of the parallel PCM bits onto the shared incoming and outgoing PCM buses to the group interfaces, provides for the incoming and output PCM bit streams to the PCM message and signal switching unit, and buffers various alarm signals. Two identical group multiplexers A and B are utilized to provide a high degree of reliability to the digital switching network. Both group multiplexers are continuously operating. Group multiplexer A (GM-A) is the primary unit that is coupled to a dedicated supergroup interface in the PCM message and signal switching unit. The group multiplexer B (GM-B) units are coupled to shared buses which are connected to the spare supergroup interface of the PCM message and signal switching unit.

Referring to FIG. 4, system clock and reference signals are received by differential receivers 415 and 416 and coupled to the various blocks of the group multiplexer and to the various group interfaces. The time-slot and frame counter 418 provides the necessary timing for the decoder 417. The decoder 417 provides 20 control lines to the various group interfaces (up to 16) for controlling the multiplexing of message bits onto the shared incoming bus and from the shared outgoing bus. The GM-A/B select line, received by differential receiver 420, is provided together with the 20 control lines from the decoder 417 to the group interfaces for selecting between the outgoing shared PCM buses from group multiplexers A and B. The clock and reference alarm detector 419 monitors the clock and reference signals received by the differential receivers 415 and 416 and provides an output control line to enable the multiplexer 421 to switch to the clock and reference signal received by the redundant group multiplexer in response to a detected failure.

The shared incoming PCM bus and group alarm from the 16 group interfaces are applied to OR gates 401 (9 separate OR gates), whose outputs are applied to latch 402. If a group alarm is detected in one of the group interfaces, the group alarm becomes a logic one which causes the output of OR gates 401 to be a logic one for the data of the corresponding incoming PCM channel. A very low level signal, commonly referred to as "quiet tone", is produced when all of the message bits for a PCM channel are a logic one. The group alarm is delayed by four time slots by the four stage register 403 and applied to OR gates 414 to produce a logic one on the corresponding outgoing PCM channel in the shared outgoing PCM bus.

The latch 402 receives in parallel the message bits together with the signal bits, the group alarm and the group interface parity alarm for each PCM channel. Thus, during each time slot, the data in the latch 402 represents the status of these various signals with respect to a corresponding PCM channel. The parity checker and generator 404 generates a parity bit for the message bits of each incoming PCM channel and applies the generated parity bit to differential drivers 407. The generated parity bit is compared with the received parity bit from the group interfaces, and the corresponding GM parity alarm signal is applied to differential driver 409 if there is disagreement. The outputs of the latch 402 are applied to differential drivers 405, 406, 407 and 408 for transmission of the respective signals to the PCM message and signal switching unit.

The outgoing parallel bit stream or highway from the PCM message and signal switching unit is applied to differential receivers 410, whose outputs are applied to latch 412. The outputs of the latch 412 for each PCM channel are applied to OR gates 414, whose outputs are coupled to the parity checker and generator 413 for generating a parity bit for inclusion with the outputs of the OR gates 414 for providing the shared outgoing PCM bus to the various group interfaces. Similarly, if the generated parity bit is different from the received parity bit, the corresponding GM parity alarm signal is provided to differential driver 411.

B. PCM Message and Signal Switching Units (FIGS. 5-7)

The PCM message and signal switching unit is divided into four blocks and one spare block, where each block includes the capacity for handling 384 PCM channels or one supergroup. Referring to FIGS. 5 and 6 arranged in accordance with FIG. 7, each block of the PCM message and signal switching unit is made up of a supergroup interface (SGI) 501–505, a time-slot interchanger (TSI) 506–510, and a signal bit sender/receiver (SBS/R) 511–515. Control of the various blocks is provided by switch computer interface A (SCI-A) 516 and switch computer interface B (SCI-B) 517. The supergroup interfaces 501–504 are coupled to a dedicated group multiplexer A for receiving incoming and outgoing parallel PCM bit streams. The spare supergroup interface 505 is coupled to the four group multiplexer B units for receiving the shared incoming and outgoing parallel PCM bit streams.

The message bits of the incoming parallel PCM bit streams are coupled from the supergroup interfaces 501–505 to each of the time-slot interchangers 506–510. Thus, each time-slot interchanger 506–510 has access to all of the supergroup interfaces 501–505, including the spare supergroup interface 505. The time-slot interchangers 506–510 store the incoming message bits for each PCM channel in an information memory at locations addressed by the time slots for the respective PCM channels. The stored message bits are then read out of the information memory to the outgoing parallel PCM bit streams as addressed by the ordering of time slots in the routing memory. The parity bit and signal bit of the outgoing parallel PCM bit stream from the timeslot interchangers 506–509 are applied to corresponding signal bit sender/receivers 511–514 and also to the spare signal bit sender/receiver 515. The remaining portion of the message bits (7 bits) for the outgoing parallel PCM bit streams together with the parity bit and signal bit provided by the signal bit sender/receivers 511–514 are applied to the corresponding supergroup interfaces 501–504 and also to the spare supergroup interface 505. An additional control signal from the time-slot interchangers 506–509 for looping back selected message bits for particular PCM channels is applied together with the outgoing parallel PCM bit streams to the corresponding supergroup interfaces 501–505. The spare supergroup interface 505 receives the outgoing parallel bit streams from all of the time-slot interchangers 506–510 and all of the signal bit sender/receivers 511–515. The spare time-slot interchanger 510 sends its parity bit and signal bit to all signal bit sender/receivers 511–515. The spare time-slot interchanger 510 sends its 7 message bits and loopback control signal together with the signal bit and parity bit from the spare signal bit sender/receiver 515 to all supergroup interfaces 501–505.

The signal bit sender/receivers 511–514 receive the incoming signal bit bus and the group alarm bus from the corresponding supergroup interfaces 501–504. In addition, the signal bit sender/receivers 511–515 receive corresponding signals from the spare supergroup interface 505. The spare signal bit sender/receiver 515 receives corresponding signals from all of the supergroup interfaces 501–505.

The PCM message and signal switching unit can be automatically reconfigured to switch any of the spare units, the spare supergroup interface 505, the spare time-slot interchanger 510, and the spare signal bit sender/receiver 515 in place of a malfunctioning corresponding unit. For example, a possible reconfiguration may provide that supergroup interface 505 replaces supergroup interface 504, or spare time-slot interchanger 510 replaces time-slot interchanger 507, a signal bit sender/receiver 515 replaces signal bit sender/receiver 513, or any combination of the above. The availability of the digital switching network is greatly enhanced by inclusion of the spare units. By switching in the appropriate spare unit, it is insured that a single failure in any one of the corresponding units will not seriously degrade the performance of the digital switching network.

Figure 8:
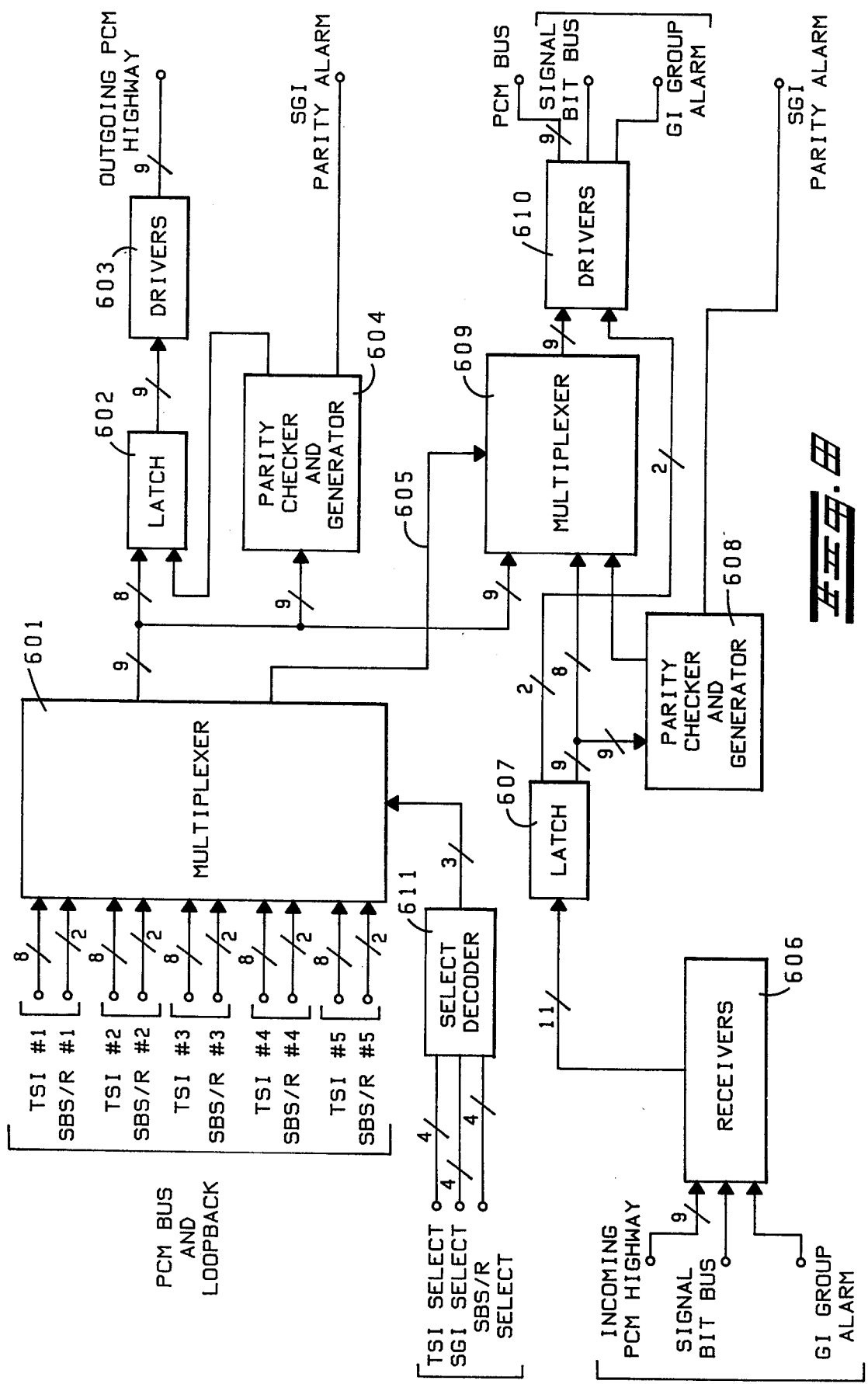
FIG. 8 shows a functional block diagram of the supergroup interface shown in FIGS. 5 and 6.
Figure 17:
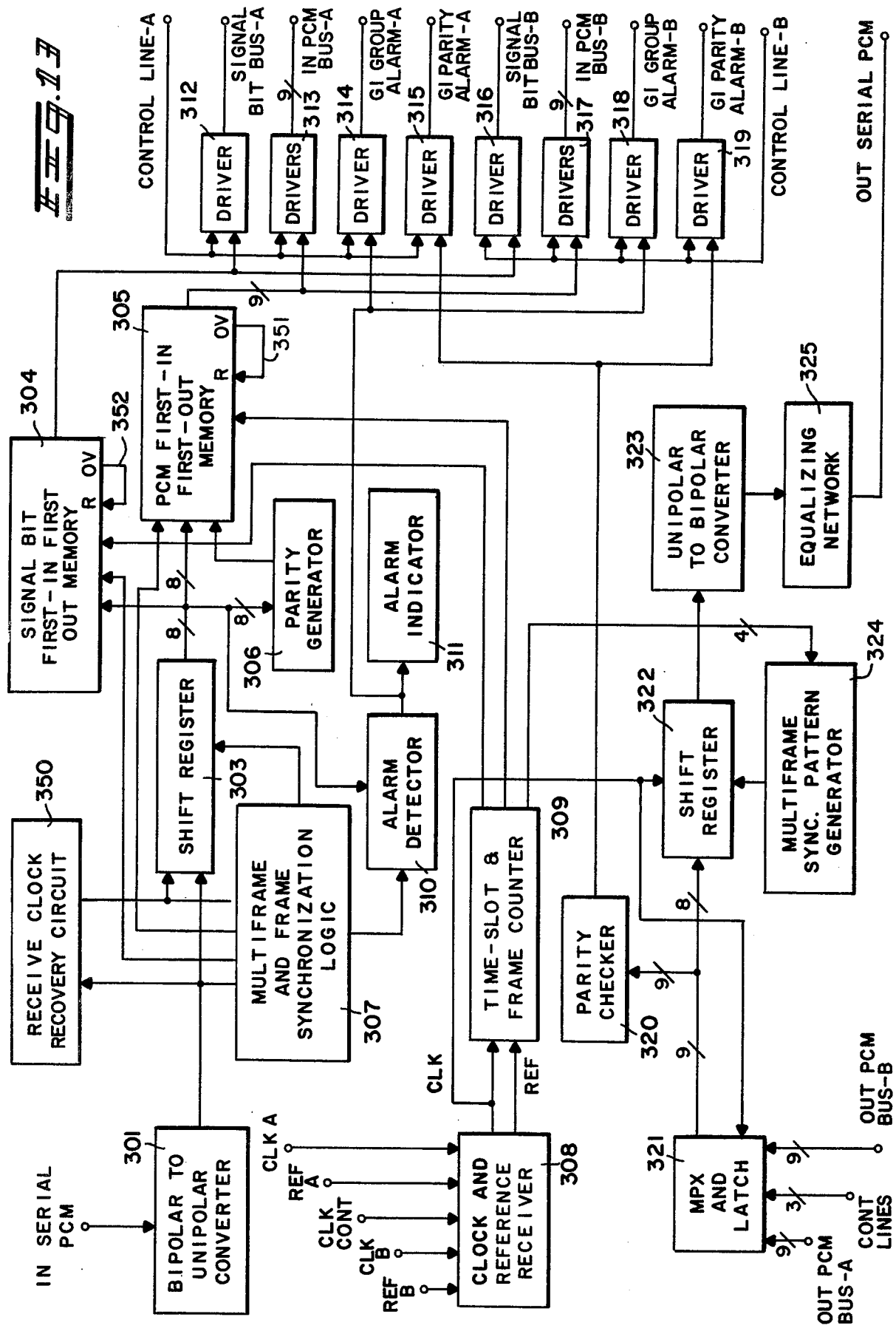

1. Supergroup Interface (FIG. 8)

The supergroup interface (SGI) buffers incoming and outgoing parallel PCM bit streams between the group multiplexers and corresponding time-slot interchangers and signal bit sender/receivers. Referring to FIG. 8, the outgoing parallel PCM bit stream and a loopback control signal from the TSI's and SBS/R's are gated by multiplexer 601 under control of the select decoder 611 to latch 602, parity checker and generator 604 and multiplexer 609. The select decoder 611 decodes the select lines from the switch computer interface which are representative of the configuration of the PCM message and signal switching unit.

The latch 602 is loaded with the message bits of each PCM channel and the generated parity bit from the parity checker and generator 604. The output of the latch 602 is applied to differential drivers 603 for transmission of the outgoing parallel PCM bit stream to a corresponding group multiplexer. If the generated parity bit from the parity checker and generator 604 does not agree with the parity bit from the multiplexer 601, the corresponding SGI parity alarm signal is provided.

The incoming parallel PCM bit stream, signal bit bus and group alarm bus from the corresponding group multiplexer are received by differential receivers 606 and loaded into latch 607. The message bits from the latch 607 are applied to multiplexer 609 and to parity checker and generator 608. The generated parity bit from the paritt checker and generator 608 is applied to multiplexer 609 and compared to the incoming parity bit from the latch 607. If there is disagreement between the generated parity bit and the parity bit from the latch 607, the parity checker and generator 608 provides the corresponding SGI parity alarm signal.

The multiplexer 609 normally routes the incoming message bits from the latch 607 and generated parity bit to driver 610. However, under control of the loopback control bit 605, the multiplexer 609 may selectively gate the nine bits from multiplexer 601 to driver 610. This operation of the multiplexer 609 provides for the looping back of message bits from the output of a particular time-slot interchanger and signal bit sender/receiver to the input of the particular time-slot interchanger. During each time slot, the message bits for an outgoing PCM channel may be looped back in place of the message bits for the incoming PCM channel of the same time slot, if the loopback control bit for the outgoing PCM channel has a logical one state. The loopback control bit is stored in the routing memory of the TSI together with the ordered time slot for each outgoing PCM channel. The loopback feature allows the exercising and checking of non-busy PCM channels in the digital switching network. The signal bits and group alarm bits from the latch 607 are applied directly to the drivers 610. The parallel PCM bus from drivers 610 are applied to all of the time-slot interchangers, and the signal bit bus and group alarm bus from drivers 610 are applied to the corresponding signal bit sender/receiver and the spare signal bit sender/receiver.

2. Time-Slot Interchanger (FIG. 9)

The time-slot interchanger (TSI) stores the message bits for the PCM channels from the incoming parallel PCM bit streams from all four supergroup interfaces. The spare supergroup interface may be switched in place of any one of the other supergroup interfaces in response to a malfunction. The message bits for the PCM channels are stored in the information memory as addressed by the corresponding time slots, for the PCM channels. The message bits for the PCM channels are read out to the outgoing parallel PCM bit streams as addressed by the ordering of time slots in the routing memory.

Referring to FIG. 9, the information memory for storing the incoming message bits for the PCM channels is organized into an odd memory block 708 and an even memory block 709. This organization is used so that the incoming message bits for the incoming PCM channels can be stored in one memory block at the same time that outgoing message bits for the outgoing PCM channels are read out from the other memory block, thus allowing the use of lower speed memory circuits and resulting in a significant cost savings. After each frame, this process is reversed so that the memory block that was just read is written, the memory block that was just written is read.

The time-slot counter 704, under control of the system clock and reference signals provides the sequential time slots for addressing the odd and even memories 708 and 709 through latch 716 by way of latching multiplexers 706 and 707, respectively. The time slots from the time-slot counter 704 also addresses the routing memory 702 for reading out the ordered time slots. The ordered time slots read out from the routing memory 702 pass through multiplexer 706 or 707 to provide addresses for the message bits for the outgoing PCM channels from the particular memory block 708 or 709 that is being read out. Updating of the ordering of time slots for the outgoing PCM channels in the routing memory 702 is accomplished via the multiplexer 701 under control of the switch computer interface A or B as determined by the SCI select A/B. A new time slot for an outgoing channel from the switch computer interface, represented by 12 data bits from the multiplexer 701, is stored in the routing memory 702 in place of the formerly stored 12 bits by a write-enable signal from the switch computer interface during the time slot from the time slot counter 704 corresponding to the outgoing PCM channel.

The routing memory provides for storage of 384 of the 12-bit ordered time slots. Each of the 12-bit ordered time slots include 9 bits which is the time-slot number, 2 bits which select one of the four blocks of information memory, and one bit for the loopback function. Except for the loopback bit, the other 11 bits of the ordered time slot provide by way of multiplexer 706 or 707 the address for the particular message bits in the odd or even memory 708 or 709 to be read out to the outgoing parallel bit stream. The routing memory 702 may be comprised of any of a number of conventional memory circuits that provide $384 \times 12$ bits of storage.

The multiplexers 711–714 select either the parallel PCM bit stream from the dedicated supergroup interfaces or the parallel PCM bit stream from the spare supergroup interface under control of the multiplexer 715. The multiplexer 715 provides the select lines from switch computer interface A or B as determined by the SCI select A/B.

The odd and even memory 708 and 709 are each subdivided into four blocks corresponding to the four dedicated supergroup interfaces. Each of these four blocks store 9 message bits for the 384 PCM channels from the corresponding parallel PCM bit streams. The four blocks can be comprised of any of a number of conventional memory circuits or combinations thereof that provide a $384 \times 9$ memory configuration for each block. The tri-state outputs of the four blocks of the odd memory 708 and the four blocks of the even memory 709 are tied together, respectively, and applied to the multiplexer 710. The readout message bits from the appropriate memory 708 or 709 are gated by the multiplexer 710 under control of the time-slot counter 704 to the outgoing parallel PCM bit stream. An additional bit for loopback operation from the routing memory 702 is provided together with the outgoing parallel PCM bit stream.

3. Signal Bit Sender/Receiver (FIG. 10)

The signal bit sender/receiver (SBS/R) stores the incoming signal bits for each incoming PCM channel from a corresponding supergroup interface and reports any logic change of the respective signal bits if not purposely ignored or masked to the signal processing unit. The signal bit sender/receiver also stores the respective outgoing signal bits together with a control bit. The outgoing signal bits and parity bits from a corresponding time-slot interchanger may be modified by the signal bit sender/receiver in accordance with the stored signal bits and control bits before application to the corresponding supergroup interface.

Referring to FIG. 10, the multiplexer 807 routes the signal bit and group alarm bit from the corresponding supergroup interface as selected by the select decoder 811 to the debounce logic 806 and alarm memory 809, respectively. The select decoder 811 decodes the select lines from the switch computer interface which are representative of the configuration of the PCM message and signal switching unit. The time-slot and frame counter 802 receives the system clock and reference signals and provides time-slot addresses to the memory address selector 803 and timing control to the memory control logic 804 and output control logic 810. The memory address selector 803 selects the time-slot address from the time-slot and frame counter 802 or from the bus interface 801 as directed by the memory control logic 804 and routes the selected address to the signal bit memory 805, debounce logic 806 and alarm memory 809.

According to the T1 format, there are 12 frames in a multiframe and frames 6 and 12 carry the signal bits for the incoming PCM channels. The outgoing frame sequence is delayed by one frame from the incoming frame sequence. For example, while incoming frame 6 is being received, outgoing frame 5 is being sent. The time-slot and frame counter 802 provides the requisite incoming frame signals. Thus, outgoing signal bits are read out of the signal bit memory 805 during incoming frames 7 and 1. Hereinafter, all further references may be assumed to refer to incoming frames. The signal bit memory 805 stores two incoming and two outgoing signal bits together with one control bit for each of the 384 incoming and outgoing PCM channels. Thus, the storage capacity of the signal bit memory 805 is 384×5 bits. The outgoing signal bits and the outgoing control bit for each PCM channel can be changed or read out by the switch computer interface via the bus interface 801. The incoming signal bits may be read out by the switch computer interface via the bus interface 801.

During frames 6 and 12, the debounce logic 806 detects changes in the logic state of the selected incoming signal bits from the multiplexer 807 by comparison with the previously received signal bits from the signal bit memory 805. When the last three received signal bits for a particular PCM channel reflect the changed logic state, the debounce logic 806 recognizes the change of logic state, temporarily stores the changed state of the signal bit, and if not masked reports the change of the signal bit by way of the bus interface 801 to the switch computer interface. During frames 2 and 8, the contents of the temporary storage are transferred to the signal bit memory 805.

The debounce logic 806 includes a memory for storing a count of the logic state changes and a mask bit for both of the incoming signal bits for each incoming PCM channel. If the mask bit for an incoming signal bit for an incoming PCM channel is a logical one, then the logical state changes for the particular incoming signal bit will still be stored but not reported to the switch computer interface. This function is necessary since some of the PCM channels will not have meaningful signal bits. The mask bits for each incoming PCM channel stored in the memory of the debounce logic 806 can be changed or read out by the switch computer interface via the bus interface 801.

The alarm memory 809 is updated when a change in the logic state of a group alarm bit is detected. The change in state of the group alarm bit is reported by way of the bus interface 801 to the switch computer interface. In response to a request from the switch computer interface, the alarm memory 809 is enabled by the memory control logic 804 in accordance with the address from the bus interface 801 provided by way of the memory address selector 803 to read out the desired group alarm to the bus interface 801 for transmission to the switch computer interface. Similarly, outgoing signal bits and corresponding control bits received by way of the bus interface 801 are stored in the signal bit memory 805 when enabled by the memory control logic 804. The particular outgoing signal bits and control bit for an outgoing PCM channel are stored in the signal bit memory 805 at address from the bus interface 801 provided by way of the memory address selector 803. Information transfer from the bus interface 801 directed to the signal bit memory 805 or memory in the debounce logic 806 is carried out during frames 3-5 and 9-11. The mask bits or signal bits may also be read by the switch computer interface during these frames.

The multiplexer 808 routes the outgoing signal bit and parity bit from the time-slot interchanger as selected by the select lines to the output control logic 810 during frames 7 and 1. The outgoing signal bits are read out of the signal bit memory 805 according to each consecutive time-slot address and applied to the control logic 810. The output control logic 810 is responsive to the control bit associated with the outgoing signal bits for each PCM channel for providing the outgoing signal bit and parity bit to the corresponding supergroup interface. For example, if the control bit and the outgoing signal bit from the signal bit memory 805 are both a logic zero, the outgoing signal bit and parity bit from the corresponding time-slot interchanger are provided to the supergroup interface. If the control bit is a logical zero and the signal bit is a logical one, the outgoing signal bit and parity bit from the time-slot interchanger are logically inverted. However, if the control bit is a logical one, the outgoing signal bit from the signal bit memory 805 is provided to the corresponding supergroup interface. In all of the foregoing examples, when the signal bit provided to the corresponding supergroup interface is different from the outgoing signal bit from the time-slot interchanger, the parity bit is logically inverted to preserve the parity of the message bits for the particular PCM channel. During all other frames 2-6 and 8-12, the outgoing signal bit and parity bit from the TSI are provided directly to the corresponding SGI by the output control logic 810. It is to be understood that many other embodiments of the output control logic 810 can be provided for enabling other possible functional operations to be performed on the outgoing signal bits and parity bits.

4. Switch Computer Interface (FIG. 11)

The switch computer interface (SCI) is coupled to the signal processing unit for enabling the interchange of supervisory signalling information for the respective PCM channels and for providing the ordering of the time slots in the routing memory of the digital switching network. The switch computer interface reports all detected alarms in the digital switching network to the signal processing unit. The signal processing unit is responsive to the reported alarms for implementing the configuration of the blocks of the digital switching network to compensate for the malfunctioning conditions.

Referring to FIG. 11, a differential clock and reference receiver 902 receives the system clock and reference signals and provides a clock and reference signal to the time-slot and frame counter 901 and for distribution throughout the PCM message and signal switching unit. The time-slot and frame counter 901 provides timing control to the parity alarm encoder 903, SBS/R control latch 910 and the TSI control latch 912. The parity alarm encoder 903 receives the SGI parity alarms and, by way of differential receiver 904, the GM parity alarms and GI parity alarm. The parity alarm encoder 903 multiplexes the various parity alarms to the bus control 905 for transmission to the signal processing unit.

The bus control 905 includes a mask register allowing the signal processing unit to selectively ignore alarm bits when their correspnding mask bit is a logical one. The mask register can be updated or read out by an appropriate instruction from the signal processing unit.

The signal processing unit provides a 16 bit output command to the switch computer interface which is stored in the latch 908. Eight of the bits of the output command from the latch 908 are routed to the instruction decode 909. The instruction decode 909 decodes the eight bits of the output command and provides a decoded control instruction having up to six bits to the selected control latch. The system configuration latch 906 is responsive to an appropriately decoded control instruction from the instruction decode 909 for configuring the multiplexer/demultiplexer unit and PCM message and signal switching unit of the digital switching network. The system configuration latch 906 provides, by way of differential driver 907, control signals for selecting group multiplexer A or B in the four supergroups of the multiplexer/demultiplexer unit. Likewise, the system configuration latch 906 provides control lines to the PCM message and signal switching unit for selecting SCI A or B and for configuring in accordance with the selected SCI the spare TSI, SGI and SBS/R to replace a malfunctioning module when necessary. The system configuration latch 906 can be read out via the bus control 905 by an appropriate instruction from the signal processing unit for providing the instant configuration of the PCM message and signal switching unit.

The SBS/R control latch 910 receives a decoded control instruction which selects one of the signal bit sender/receivers. At the same time, the decoded instruction enables SBS/R data latch 913 to receive data bits from the latch 908 which are routed to the selected SBS/R. Also, the IRD latch 914 is enabled by the decoded SBS/R control instruction to receive data bits from the latch 908 for providing addressing information to the SBS/R's. Data transferred to the selected SBS/R provides outgoing signal bits and corresponding control bits and masks for ignoring incoming signal bits for selected incoming PCM channels. If data is to be read out from the selected SBS/R, the read-out data and its corresponding address are returned by way of the bidirectional data buses 920 and 921, respectively, to the bus control 905 for transmission to the signal processing unit.

The TSI control latch 912 is loaded with an appropriately decoded control instruction from the instruction decode 909 for selecting one of the TSI's. The decoded TSI write-control instruction enables the IRS latch 911 to receive 12 data bits from the latch 908 for providing a TSI data work for storing a new time slot in the routing memory of the selected TSI. The decoded TSI read-control instruction enables the selected TSI to read out a stored time slot from the routing memory to the bidirectional data bus 922 for transmission by the bus control 905 to the signal processing unit. The read-control and write-control are provided during the time slot of the corresponding PCM channel which is being accessed.

III. Signal Processing Unit (FIG. 1 and FIG. 12)

The operation of the signal processing unit 50 may be further detailed with reference to FIG. 1. The switching control unit 58 processes the supervisory signalling from the T1 bit streams for transmission to the call processing computer 51. The call processing computer 51 provides the ordering of time slots for the PCM channels to the digital-switching network in response to the supervisory signalling from the switching control unit 58. The call processing computer 51 coordinates the tasks of the cell coordination computer 53 and the DAS and data base computer 52 in order to provide communication paths between mobile radiotelephones and the land-line telephones. The call processing computer 51 insures that all calls are routed according to the telephone system dialing plan for the particular geographical area of the telephone system. Telephone numbering plans are basically described by Talley in Chapter 1 of "Basic Telephone Switching Systems", published by Hayden Book Co., Inc., 1969 and by American Telephone and Telegraph (A.T.&T.) in section 2 of "Notes on Distance Diaing", published by A.T.&T. Bell Telephone System, 1975. The teleprinter 54 provides a manmachine interface to the call processing computer 51 for accessing the resources of the telephone system and providing automatic printout of routine and alarm information.

The processing of a particular call is shared between the switching control unit 58 and the call processing computer 51. Upon receipt of off-hook or on-hook status of a particular analog port, the switching control unit 58 automatically routes the particular port to a progress tone from the tone signalling unit. In preparation for the receipt of dialing, pre-established analog ports which utilize multifrequency signalling are routed by the switching control unit 58 to the tone signalling unit for reception of the particular type of multi-frequency signalling. Otherwise dialed digits are then received and forwarded to the call processing computer 51 for analysis. The dialing information is analyzed and verified by the call processing computer before being adapted to the particular format for outpulsing on the outgoing PCM channel to the called party. At the termination of a call, requisite signalling functions are provided by the switching control unit 58.

Included in the analysis of the dialed digits by the call processing computer 51 is cooperation with the DAS and data base computer 52 to determine the class of service of the calling party and number translation of the dialed digits in accordance with the system dialing plan. In the case of a mobile radiotelephone, a determination is made as to whether the particular mobile telephone number is valid and contained in a subscriber file for the telephone system. Service would be denied to unauthorized mobile radiotelephones. Mobile radiotelephones not in the local mobile network may be located in remote mobile networks accessible from the local mobile network. Subscriber files, number translation tables and other necessary system files may be stored on the mass storage unit 56. The DAS and data base computer 52 also records necessary billing information on the magnetic tape unit 55.

Once it has been determined that the dialed digits are valid, the cell coordination computer 53 provides for the necessary radio communications path to the called mobile radiotelephone. If the call was initiated by a mobile radiotelephone, the radio communications path will have already have been received by the cell coordination computer 53. The cell coordination computer 53 coordinates the tracking of the mobile radiotelephone during the call in order to implement any necessary hand-off of the call when a mobile ratiotelephone passes from one cell into another. For example, the hand-off of the call may be initiated by setting up a party call through the party call unit, where a free radio channel in the adjacent cell is included as a third party in the particular telephone call. When the modile radio-telephone enters the adjacent cell, communications are then provided on the new radio channel and the former radio channel is released.

Referring to FIG. 12, the switching control unit includes a switching control computer 100, clock and reference A (101) and clock and reference B (102). The switching control computer 100 interfaces to the call processing computer by means of redundant internodal links A and B and to the switch computer interface units by way of a 32 bit input/output bus. The computers 51, 52, 53 and 58 (see FIG. 1) of the telephone system are each configured as dual redundant computers, each redundant computer being capable of performing the requisite tasks of the other in the event of a failure in its dual. The computers can be any of a number of commercially available computers or microcomputers, may be initiated by setting up a party call through the party call unit, where a free radio channel in the adjacent cell is included as a third party in the particular telephone call. When the mobile radio-telephone enters the adjacent cell, communications are then provided on the new radio channel and the former radio channel is released.

Referring to FIG. 12, the switching control unit includes a switching control computer 100, clock and reference A (101) and clock and reference B (102). The switching control computer 100 interfaces to the call processing computer by means of redundant internodal links A and B and to the switch computer interface units by way of a 32 bit input/output bus. The computers 51, 52, 53 and 58 (see FIG. 1) of the telephone system are each configured as dual redundant computers, each redundant computer being capable of performing the requisite tasks of the other in the event of a failure in its dual. The computers can be any of a number of commercially available computers or microcomputers, such as, for example, the Motorola M6800 microcomputer system. The detailed operation and programming of the Motorola M6800 microcomputer system is described in "M6800 Microcomputer System Design Data", published by Motorola, Inc., 1976, in "M6800 Programming Reference Manual", published by Motorola, Inc., 1976 and in U.S. Pat. No. 4,030,079, entitled "Processor Including Incrementer and Program Register Structure", by Thomas H. Bennett et al, issued June 14, 1977 and assigned to the present assignee.

The 32 bit input/output bus to the SCI's is comprised of a 16 bit input and a 16 bit output unidirectional bus. Instructions from the switching control computer 100 are provided on the 16 bit output bus by 16 bit words having a command portion and a data portion. LIkewise, information from the SCI's is placed in the 16 bit input bus having a data portion and a coded address portion identifying the nature of the data portion. These 16 bit buses can be interfaced to the switching control computer 100 by a number of commercially available interface adapters such as the Motorola M6820 peripheral interface adapter described in the aforementioned references and in U.S. Pat. No. 3,979,730, entitled "Interface Adapter Having Control Register", by Thomas H. Bennett et al, issued on Sept. 7, 1976 and assigned to the present assignee.

Clock and reference A and B (101 and 102) provide redundant system clock and reference signals for synchronizing the various units in the digital switching network. Clock and reference A (101) is the primary unit, while B (102) is the secondary unit. The clock signals are provided differentially at a frequency of 3.088 MHz to the digital switching network. In addition, separate clock signals at 3.088 MHz are provided to each computer of the signal processing unit. Each of the reference signals also provided differentially are a pulse occurring at the beginning of each multiframe of the T1 format and are used to multiframe synchronize the digital switching network. Clock and reference B (102) is phase synchronized to clock and reference A (101), however, in the event of a malfunction in clock and reference A (101), clock and reference B (102) will operate independently.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. In a telephone system comprising:
    (a) a land-line telephone system having analog ports and including a land-line switching network for providing communication paths to a plurality of land-line telephones; and
    (b) a mobile radiotelephone system coupled to the land-line switching network for providing communication paths between mobile radiotelephones and between mobile radio-telephones and land-line telephones, said mobile radio telephone system including:
        (i) a plurality of base stations having analog ports, eac of the base stations providing communication paths to mobile ratiotelephones in the vicinity thereof;
        (ii) a digital switching network for switching between a predetermined number of pairs of incoming and outgoing serial pulse-code-modulated (PCM) bit streams, each serial PCM bit stream formatted in a plurality of PCM frames of a predetermined number of PCM channels, each PCM channel having corresponding message bits representative of analog signals and signal bits representative of supervisory signals for the PCM channel; and (iii) PCM analog-to-digital (A/D) and digital-to-analog (D/A) converters interposed between the digital switching network and the respective base stations and between the digital switching network and the land-line networ, said PCM A/D and D/A converters interfacing analog ports of the land-line network and base stations to pairs of incoming and outgoing PCM bit streams, each analog port having analog signals and supervisory signals and further having a pre-established incoming and outgoing PCM channel; and (c) said digital switching network including:

(i) a multiplexer for multiplexing the predetermined number of the incoming serial PCM bit streams to provide an incoming parallel bit stream, the incoming parallel bit stream having a time slot corresponding to each PCM channel in the predetermined number of incoming serial PCM bit streams;

(ii) a time-slot-interchanger for interchanging the incoming PCM channels in the incoming parallel bit stream according to an ordering of time slots in a routing memory to provide an outgoing parallel bit stream; and (iii) a demultiplexer for demultiplexing the outgoing parallel bit stream to provide the predetermined number of outgoing serial bit streams; and (d) wherein said digital switching network includes improvement which comprises:

means for providing a system clock signal and a system multiframe-synchronization signal marking the beginning of each system multiframe having a predetermined number of system frames, the outgoing serial PCM bit streams being transmitted by the demultiplexer in successive system multiframes in response to the system clock signal;

said PCM A/D and D/A converters being adapted to recover the system clock signal from their respective outgoing serial PCM bit streams and transmitting with the recovered system clock signal their respective incoming serial PCM bit streams formatted in successive incoming multiframes having a number of incoming PCM frames equal to the predetermined number of system PCM frames;

said multiplexer including, for each of the incoming serial PCM bit streams, a first-in first-out (FIFO) memory, a frame counter responsive to the system multiframe-synchronization signal for providing system frame signals corresponding to the predetermined number of system frames, means coupled to the incoming serial PCM bit stream for detecting an incoming multiframe-synchronization signal, means coupled to the incoming serial PCM bit stream for receiving and storing in consecutive order in the FIFO memory the subsequent incoming signal bits for each incoming PCM channel in response to the detected incoming multiframe-synchronization signal, means for reading out of the FIFO memory the stored signal bits in response to selected ones of the system frame signals, means for multiplexing the read-out signal bits to provide an incoming signal bit stream;

signal detecting means coupled to the incoming signal bit stream for sensing the state of the incoming signal bits for each of the respective incoming PCM channels;

signal processing means responsive to the sensed incoming signal bits for ordering the time slots in the routing memory to route incoming PCM channels to selected outgoing PCM channels and for generating corresponding outgoing signal bits adapted to a pre-established format recognizable by the outgoing PCM channels; and means for applying the outgoing signal bits to the outgoing parallel bit stream.

2. The telephone system according to claim 1, wherein each system and incoming multiframe includes twelve frames, each frame has twenty-four PCM channels and each PCM channel has at least two signal bits per multiframe, the FIFO memory having at least forty-eight storage locations for storing the signal bits transmitted in each incoming multiframe.

3. The telephone system according to claim 1, wherein each system and incoming multiframe includes sixteen frames, each frame having thirty-two channels, two channels being signalling channels and thirty channels being PCM channels, each PCM channel having at least four signal bits per multiframe, the FIFO memory having at least 128 storage locations for storing the signal bits transmitted in each signalling channel in each incoming multiframe.

4. The telephone system according to claim 1, wherein the multiplexer includes, for each of the incoming serial PCM bit streams, a second first-in first-out (FIFO) memory, and means coupled to the incoming serial PCM bit stream for receiving and storing in consecutive order in the second FIFO memory the subsequent message bits for each incoming PCM channel in response to the detected incoming multiframe-synchronization signal, reading out of the second FIFO memory the stored message bits in response to the system frame signals, and multiplexing the read-out message bits to provide the incoming parallel bit stream.

5. The telephone system according to claim 4, wherein each system and incoming multiframe includes twelve frames, each frame has twenty-four PCM channels and each PCM channel has essentially eight message bits per frame and at least two signal bits per multiframe, the first FIFO memory having at least forty-eight storage locations for storing the signal bits transmitted in each incoming multiframe and the second FIFO memory having at least 192 storage locations for storing the message bits transmitted in each incoming frame.

6. The telephone system according to claim 4, wherein each system and incoming multiframe includes sixteen frames, each frame having thirty-two channels, two signalling channels carrying signal bits and thirty PCM channels carrying message bits, each PCM channel having at least eight message bits per frame and at least four signal bits per multiframe, the first FIFO memory having at least 128 storage locations for storing the signal bits transmitted in each signalling channel in each incoming multiframe and the second FIFO memory having at least 240 storage locations for storing the message bits transmitted in each incoming frame.

7. The telephone system according to claim 1, wherein said incoming multiframe synchronization signal detecting means includes means for providing an alarm signal when the incoming multiframe synchronization signal is not detected, and said demultiplexer includes means responsive to the alarm signal for replacing outgoing message bits with a predetermined bit pattern providing a low level audio signal.

8. In a telephone system comprising:
(a) a land-like telephone system having analog ports and including a land-like switching network for providing communication paths to a plurality of land-line telephones; and
(b) a mobile radiotelephone system coupled to the land-line switching network for providing communication paths between mobile radiotelephones and between mobile radio-telephones and land-line telephones, said mobile radiotelephone system including:
  (i) a plurality of base stations having analog ports, each of the base stations providing communication paths to mobile radiotelephones in the vicinity thereof;
  (ii) a digital switching network for switching between a predetermined number of pairs of incoming and outgoing serial pulse-code-modulated (PCM) bit streams, each serial PCM bit stream formatted in a plurality of PCM frames of a predetermined number of PCM channels, each PCM channel having corresponding message bits representative of analog signals and signal bits representative of supervisory signals for the PCM channel;
  (iii) PCM analog-to-digital (A/D) and digital-to-analog (D/A) converters interposed between the digital switching network and the respective base stations and between the digital switching network and the land-line network, said PCM A/D and D/A converters interfacing the analog ports of the land-line network and base stations to pairs of incoming and outgoing PCM bits streams, each analog port having analog signals and supervisory signals and further having a pre-established incoming and outgoing PCM channel; and
(c) said digital switching network including:
  (i) a multiplexer for multiplexing the predetermined number of the incoming serial PCM bit streams to provide an incoming parallel bit stream, the incoming parallel bit stream having a time slot corresponding to each PCM channel in the predetermined number of incoming serial PCM bit streams;
  (ii) a time-slot-interchanger for interchanging the incoming PCM channels in the incoming parallel bit stream according to an ordering of time slots in a routing memory to provide an outgoing parallel bit stream; and
  (iii) a demultiplexer for demultiplexing the outgoing parallel bit stream to provide the predetermined number of outgoing serial bit streams; and
(d) wherein said digital switching network includes improvement which comprises:
means for providing a system clock signal and a system multiframe-synchronization signal marking the beginning of each system multiframe having a predetermined number of sequential system frames, the outgoing serial PCM bit streams being transmitted by the demultiplexer in successive system multiframes in response to the system clock signal;
said PCM A/D and D/A converters being adapted to recover the system clock signal from their respective outgoing serial PCM bit streams and transmitting with the recovered system clock signal their respective incoming PCM bit streams formatted in successive incoming multiframes having a number of sequential incoming PCM frames equal to the predetermined number of system PCM frames;
a frame counter coupled to the system clock signal and the system multiframe-synchronization signal for providing sequential system frame signals corresponding to the predetermined number of system frames,
a time-slot counter coupled to the system clock signal and system frame signals for providing sequential time-slot signals for each PCM channel,
said multiplexer including, for each of the incoming serial PCM bit streams, a first-in first-out (FIFO) memory, means coupled to the incoming serial PCM bit stream for detecting an incoming multiframe-synchronization signal, means coupled to the incoming serial PCM bit stream for receiving and storing in consecutive order in the FIFO memory the subsequent incoming signal bits for each incoming PCM channel in response to the detected incoming multiframe-synchronization signal, and means responsive to the time-slot signals in selected frame signals for reading out of the FIFO memory the stored signal bits and multiplexing the read-out signal bits to provide an incoming signal bit stream;
signal processing means including an incoming signal bit memory, an outgoing signal-bit memory, means coupled to the incoming signal bit stream for receiving and storing the signal bits for each PCM channel in the incoming signal-bit memory in response to the time-slot signals in the selected frame signals, means for detecting logical state changes between the stored signal bits and previously stored signal bits, means responsive to the detected logical state changes of the signal bits of each PCM channel for ordering the time slots in the routing memory and generating outgoing signal bits for each PCM channel, means for storing the generated outgoing signal bits for each PCM channel in the outgoing signal-bit memory, and means for reading out the stored outgoing signal bits from the outgoing signal-bit memory and applying the read-out outgoing signal bits to the outgoing parallel bit stream in response to the time-slot signals of the selected frame signals.

9. The telephone system according to claim 8, wherein said demultiplexer is coupled to the multiplexer for selectively looping back message bits from an outgoing PCM channel in the outgoing parallel bit stream to the corresponding incoming PCM channel in the incoming parallel bit stream, the routing memory of said time-slot-interchanger including a loopback control bit for each time-slot, each outgoing PCM channel in the outgoing parallel bit stream being looped back to its respective incoming PCM channel in the incoming parallel bit stream when its corresponding loopback bit has a predetermined logical state.

10. The telephone system according to claim 9, wherein the message bits of an incoming PCM channel are periodically interrupted by periodically changing the logical state of the loopback bit.

11. The telephone system according to claim 8, wherein the signal processing means recognizes a change in the logical state of the sensed signal bits from an incoming PCM channel when the respective sensed incoming signal bits have the same changed logical state as at least the one previously sensed respective incoming signal bits.

12. The telephone system according to claim 8, wherein the signal processing means generates for selected PCM channels outgoing signal bits corresponding to the incoming signal bits but adapted according to a predetermined logical function.

13. The telephone system according to claim 8, wherein the signal processing means includes means for ignoring logical state changes of the incoming signal bits from selected incoming PCM channels.

14. The telephone system according to claim 13, wherein the ignoring means includes logical masking means.

15. The telephone system according to claim 13, wherein the signal processing means includes means for generating for selected PCM channels outgoing signal bits according to preestablished bit patterns.

16. The telephone system according to claim 8, wherein the multiplexer includes, for each of the incoming serial PCM bit streams, a second first-in first-out (FIFO) memory, and means coupled to the incoming serial PCM bit stream for receiving and storing in consecutive order in the second FIFO memory the subsequent message bits for each incoming PCM channel in response to the detected incoming multiframe-synchronization signal, reading out of the second FIFO memory the stored message bits in response to the system frame signals, and multiplexing the read-out message bits to provide the incoming parallel bit stream.

17. The telephone system according to claim 16, wherein each system and incoming multiframe includes twelve frames, each frame has twenty-four PCM channels and each PCM channel has essentially eight message bits per frame and at least two signal bits per multiframe, the first FIFO memory having at least forty-eight storage locations for storing the signal bits transmitted in each incoming multiframe and the second FIFO memory having at least 192 storage locations for storing the message bits transmitted in each incoming frame.

18. The telephone system according to claim 16, wherein each system and incoming multiframe includes sixteen frames, each frame having thirty-two channels, two signalling channels carrying signal bits and thirty PCM channels carrying message bits, each PCM channel having at least eight message bits per frame and at least four signal bits per multiframe, the first FIFO memory having at least 128 storage locations for storing the signal bits transmitted in each signalling channel in each incoming multiframe and the second FIFO memory having at least 240 storage locations for storing the message bits transmitted in each incoming frame.

19. In a telephone system comprising:
(a) a land-line telephone system having analog ports and including a land-line switching network for providing communication paths to a plurality of land-line telephones; and
(b) a mobile radiotelephone system coupled to the land-line switching network for providing communication paths between mobile radiotelephones and between mobile radiotelephones and land-line telephones, said mobile radiotelephone system including:
  (i) a plurality of base stations having analog ports, each of the base stations providing communication paths to mobile radiotelephones in the vicinity thereof;
  (ii) a digital switching network for switching between a predetermined number of pairs of incoming and outgoing serial pulse-code-modulated (PCM) bit streams, each serial PCM bit stream formatted in a plurality of PCM frames of a predetermined number of PCM channels, each PCM channel having corresponding message bits representative of analog signals and signal bits representative of supervisory signals for the PCM channel;
  (iii) PCM analog-to-digital (A/D) and digital-to-analog (D/A) converters interposed between the digital switching network and the respective base stations and between the digital switching network and the land-line network, said PCM A/D and D/A converters interfacing the analog ports of the land-line network and base stations to pairs of incoming and outgoing PCM bit streams, each analog port having analog signals and supervisory signals and further having a pre-established incoming and outgoing PCM channel; and
(c) said digital switching network including:
  (i) a multiplexer for multiplexing the predetermined number of the incoming serial PCM bit streams to provide an incoming parallel bit stream, the incoming parallel bit stream having a time slot corresponding to each PCM channel in the predetermined number of incoming serial PCM bit streams;
  (ii) a time-slot-interchanger for interchanging the incoming PCM channels in the incoming parallel bit stream according to an ordering of time slots in a routing memory to provide an outgoing parallel bit stream; and
  (iii) a demultiplexer for demultiplexing the outgoing parallel bit stream to provide the predetermined number of outgoing serial bit streams; and
(d) wherein said digital switching network includes improvement which comprises:
means for providing a system clock signal and a system multiframe-synchronization signal marking the beginning of each system multiframe having a predetermined number of sequential system frames, the outgoing serial PCM bit streams being transmitted by the demultiplexer in successive system multiframes in response to the system clock signal;
a frame counter coupled to the system clock signal and the system multiframe-synchronization signal for providing sequential system frame signals corresponding to the predetermined number of system frames,
a time-slot counter coupled to the system clock signal and system frame signals for providing sequential time-slot signals for each PCM channel,
said multiplexer including, for each of the incoming serial PCM bit streams, a first-in first-out (FIFO) memory, means coupled to the incoming serial PCM bit stream for recovering an incoming clock signal, means coupled to the incoming serial PCM bit stream for detecting an incoming multiframe-synchronization signal, means coupled to the incoming serial PCM bit stream for receiving and storing in consecutive order in the FIFO memory the subsequent incoming signal bits for each incoming PCM channel in response to the detected incoming multiframe-synchronization signal and recovered incoming clock signal, and means responsive to the time-slot signals in selected frame signals for reading out of the FIFO memory the stored signal bits and multiplexing the read-out signal bits to provide an incoming signal bit stream;

signal processing means including an incoming signal-bit memory, an outgoing signal-bit memory, means coupled to the incoming signal bit stream for receiving and storing the signal bits for each PCM channel in the incoming signal-bit memory in response to the time-slot signals in the selected frame signals, means for detecting logical state changes between the stored signal bits and previously stored signal bits, means responsive to the detected logical state changes of the signal bits of each PCM channel for ordering the time slots in the routing memory and generating outgoing signal bits for each PCM channel, means for storing the generated outgoing signal bits for each PCM channel in the outgoing signal-bit memory, and means for reading out the stored outgoing signal bits from the outgoing signal-bit memory and applying the read-out outgoing signal bits to the outgoing parallel bit stream in response to the time-slot signals of the selected frame signals.

20. The telephone system according to claim 19, wherein the multiplexer includes, for each of the incoming serial PCM bit streams, a second first-in first-out (FIFO) memory, and means coupled to the incoming serial PCM bit stream for receiving and storing in consecutive order in the second FIFO memory the subsequent message bits for each incoming PCM channel in response to the detected incoming multiframe-synchronization signal, reading out of the second FIFO memory the stored message bits in response to the system frame signals, and multiplexing the read-out message bits to provide the incoming parallel bit stream.

21. The telephone system according to claim 20, wherein each system and incoming multiframe includes twelve frames, each frame has twenty-four PCM channels and each PCM channel has essentially eight message bits per frame and at least two signal bits per multiframe, the first FIFO memory having at least forty-eight storage locations for storing the signal bits transmitted in each incoming multiframe and the second FIFO memory having at least 192 storage locations for storing the message bits transmitted in each incoming frame.

22. The telephone system according to claim 20, wherein each system and incoming multiframe includes sixteen frames, each frame having thirty-two channels, two signalling channels carrying signal bits and thirty PCM channels carrying message bits, each PCM channel having at least eight message bits per frame and at least four signal bits per multiframe, the first FIFO memory having at least 128 storage locations for storing the signal bits transmitted in each signalling channel in each incoming multiframe and the second FIFO memory having at least 240 storage locations for storing the message bits transmitted in each incoming frame.

23. The telephone system according to claim 20, wherein said first FIFO memory includes means for detecting when a predetermined maximum number of signal bits have been stored therein and clearing the first FIFO memory of all stored signal bits when the predetermined maximum number of stored signal bits is detected, and said second FIFO memory includes means for detecting when a predetermined maximum number of message bits have been stored therein and clearing the second FIFO memory of all stored message bits when the predetermined maximum number of message bits is detected.

24. The telephone system according to claim 19, wherein said demultiplexer is coupled to the multiplexer for selectively looping back message bits from an outgoing PCM channel in the outgoing parallel bit stream to the corresponding incoming PCM channel in the incoming parallel bit stream, the routing memory of said time-slot-interchanger including a loopback control bit for each time-slot, each outgoing PCM channel in the outgoing parallel bit stream being looped back to its respective incoming PCM channel in the incoming parallel bit stream when its corresponding loopback bit has a predetermined logical state.

25. The telephone system according to claim 19, wherein the message bits of an incoming PCM channel are periodically interrupted by periodically changing the logical state of the loopback bit.

26. The telephone system according to claim 19, wherein said FIFO memory includes means for detecting when a predetermined maximum number of signal bits have been stored therein and clearing the FIFO memory of all stored signal bits when the predetermined maximum number of stored signal bits is detected.

* * * * *

UNITED STATES PATENT AND TRADEMARK OFFICE
CERTIFICATE OF CORRECTION

PATENT NO. : 4,268,722

DATED : 5/19/81

INVENTOR(S) : RICHARD I. LITTLE, BARRY DONALD LUBIN, AND STEPHEN LEE SPEAR

It is certified that error appears in the above—identified patent and that said Letters Patent is hereby corrected as shown below:

COLUMN 24, line 56, delete "eac" and insert --each--

COLUMN 25, line 5, delete "networ" and insert --network--

COLUMN 27, line 2, delete "land-like" and insert --land-line--

Signed and Sealed this

Tenth Day of August 1982

[SEAL]

Attest:

GERALD J. MOSSINGHOFF

Attesting Officer  Commissioner of Patents and Trademarks